United States Patent
Jang et al.

(10) Patent No.: US 10,158,967 B2
(45) Date of Patent: Dec. 18, 2018

(54) ELECTRONIC DEVICE AND METHOD FOR PROVIDING FUNCTION IN ELECTRONIC DEVICE

(71) Applicant: Samsung Electronics Co., Ltd., Gyeonggi-do (KR)

(72) Inventors: Dong-Ho Jang, Gyeonggi-do (KR); Moon-Soo Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/177,501

(22) Filed: Jun. 9, 2016

(65) Prior Publication Data

US 2016/0366541 A1     Dec. 15, 2016

(30) Foreign Application Priority Data

Jun. 10, 2015  (KR) .................. 10-2015-0082054

(51) Int. Cl.
| | | |
|---|---|---|
| *H04B 7/00* | (2006.01) | |
| *H04W 4/00* | (2018.01) | |
| *H04W 12/04* | (2009.01) | |
| *H04L 29/06* | (2006.01) | |
| *G06F 21/53* | (2013.01) | |
| *H04W 4/80* | (2018.01) | |
| *H04W 8/00* | (2009.01) | |

(52) U.S. Cl.
CPC ............ *H04W 4/008* (2013.01); *G06F 21/53* (2013.01); *H04L 63/062* (2013.01); *H04W 4/80* (2018.02); *H04W 12/04* (2013.01); *H04W 8/005* (2013.01)

(58) Field of Classification Search
CPC ..... G06F 12/00; H04L 41/048; H04L 63/062; H04W 12/04; H04W 4/008; H04W 8/005
See application file for complete search history.

(56) References Cited

U.S. PATENT DOCUMENTS

| | | | |
|---|---|---|---|
| 7,421,716 B1* | 9/2008 | Margulis ................... | G06F 8/60 719/316 |
| 2007/0061527 A1* | 3/2007 | Asthana .................... | G06F 8/62 711/159 |
| 2008/0242220 A1* | 10/2008 | Wilson ................ | H04M 1/7253 455/3.04 |
| 2008/0298588 A1* | 12/2008 | Shakkarwar ........... | G06Q 20/02 380/255 |
| 2010/0313210 A1* | 12/2010 | Lin ...................... | H04L 61/1576 719/328 |
| 2013/0052950 A1* | 2/2013 | Hillan ................... | H04W 8/005 455/41.1 |
| 2014/0310355 A1* | 10/2014 | Work ...................... | G06Q 10/10 709/204 |
| 2014/0315494 A1 | 10/2014 | Son et al. | |

(Continued)

FOREIGN PATENT DOCUMENTS

KR    10-2013-0050788 A    5/2013

*Primary Examiner* — Xin Jia
(74) *Attorney, Agent, or Firm* — Cha & Reiter, LLC.

(57) ABSTRACT

An electronic device comprising: a memory including a first memory area associated with a first application; and at least one processor operatively coupled to the memory, configured to: detect that a connection is established between the electronic device and an external electronic device; and allocate a second memory area in the memory in response to detecting that the connection is established.

19 Claims, 24 Drawing Sheets

(56) References Cited

U.S. PATENT DOCUMENTS

| | | | |
|---|---|---|---|
| 2015/0033002 A1* | 1/2015 | Cordero | G06F 12/023 713/1 |
| 2015/0178236 A1* | 6/2015 | Sharma | G06F 13/385 710/38 |
| 2015/0264142 A1* | 9/2015 | Yamaura | H04L 67/1097 709/216 |
| 2016/0285960 A1* | 9/2016 | Jodlauk | H04W 4/02 |

* cited by examiner

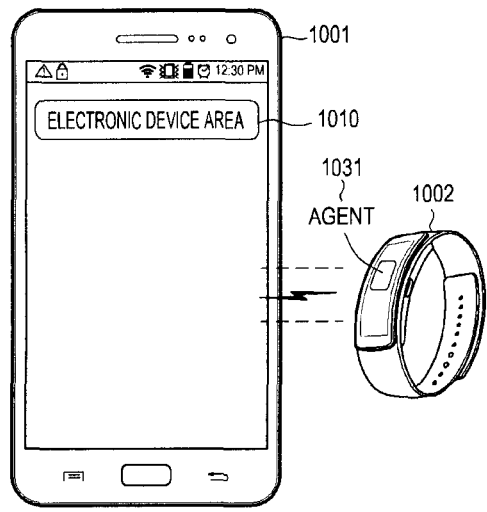
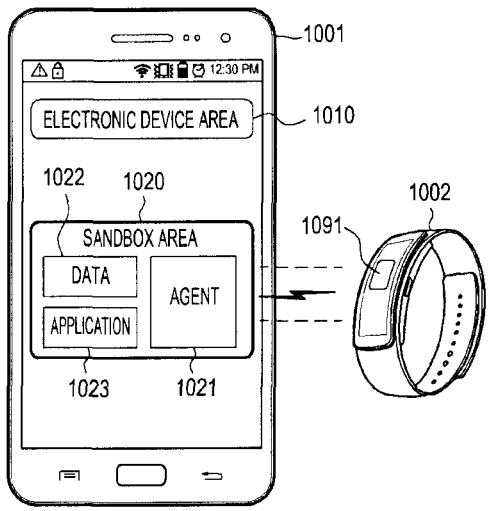
FIG.10A          FIG.10B
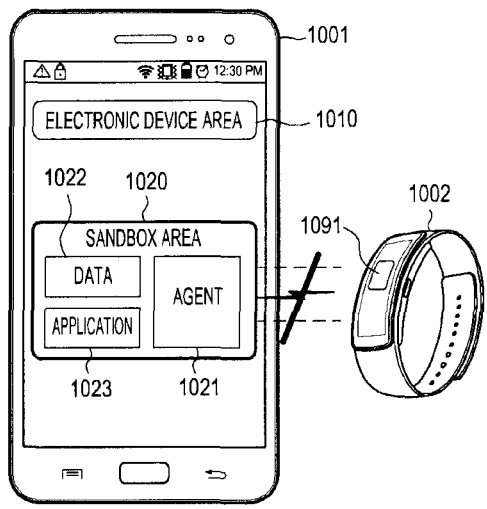
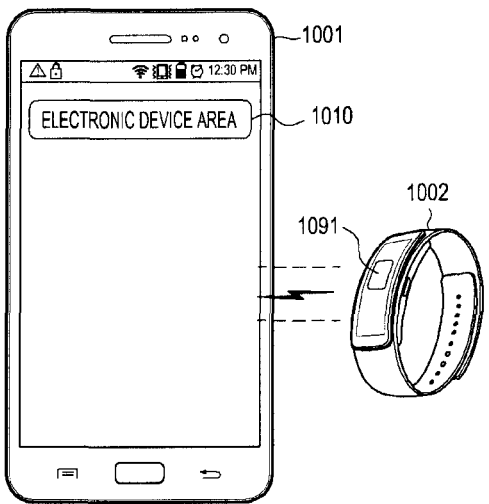
FIG.10C          FIG.10D

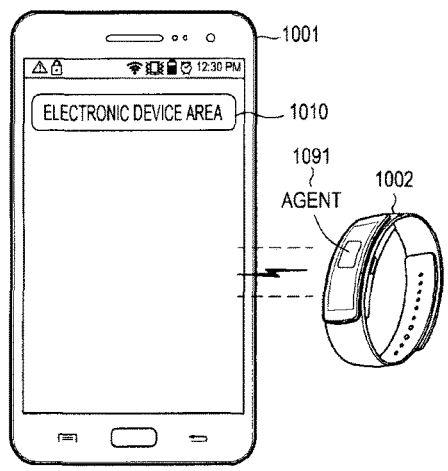
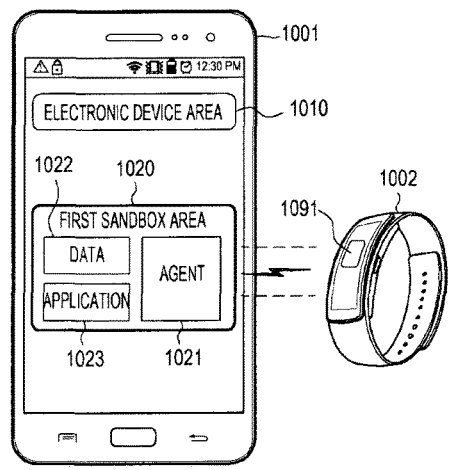
FIG.11A     FIG.11B
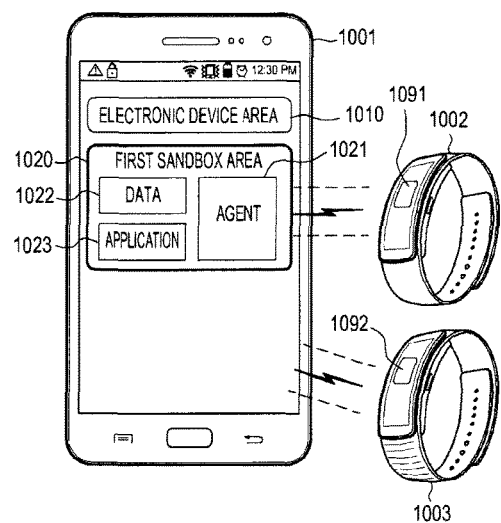
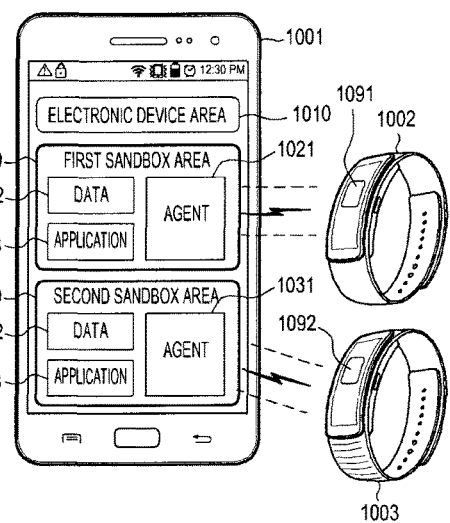
FIG.11C     FIG.11D

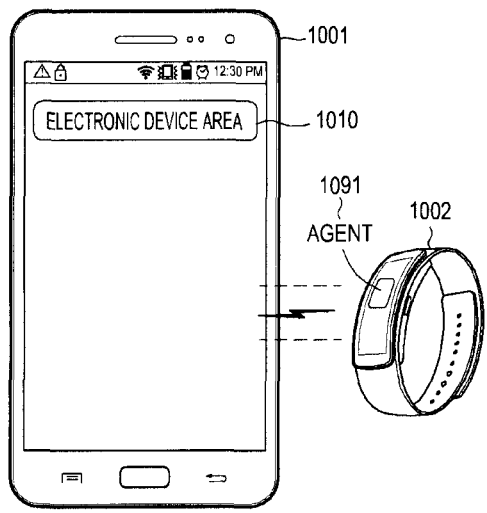
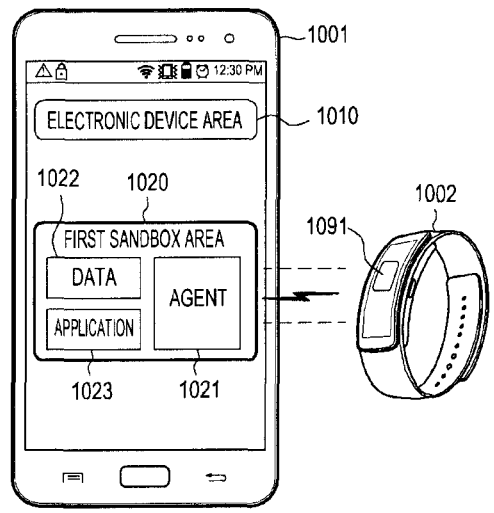
FIG.12A  FIG.12B
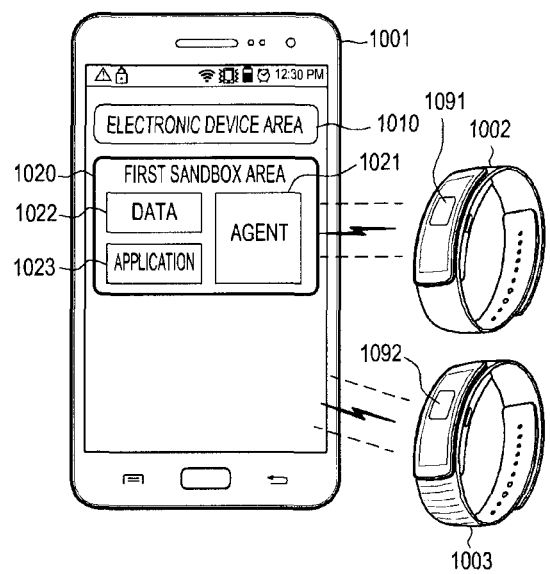
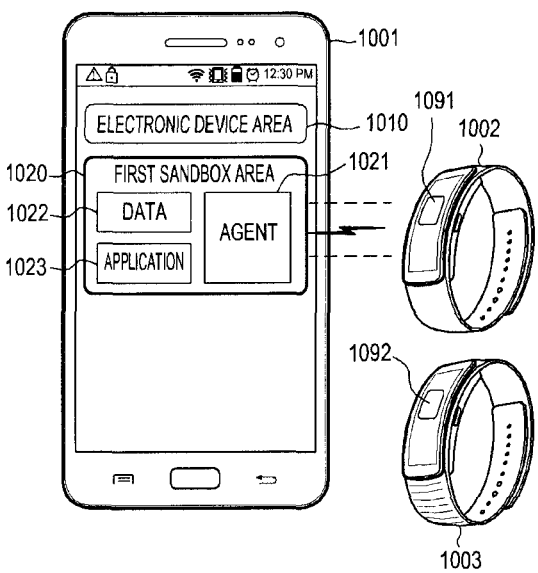
FIG.12C  FIG.12D

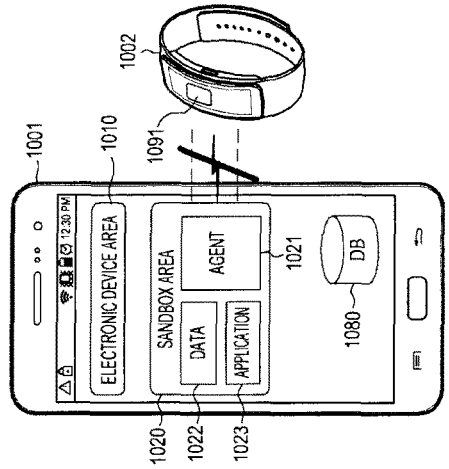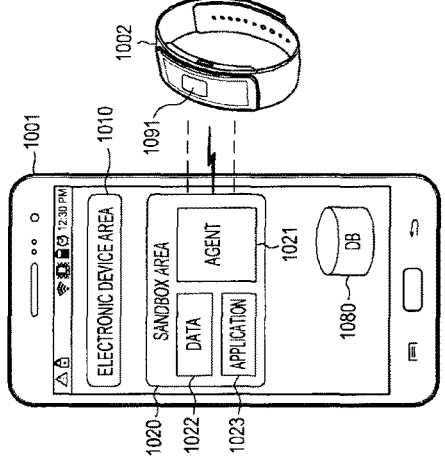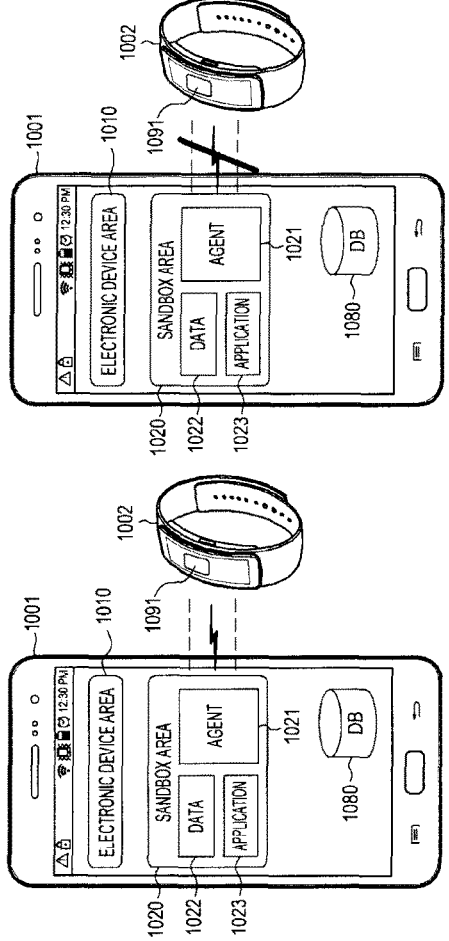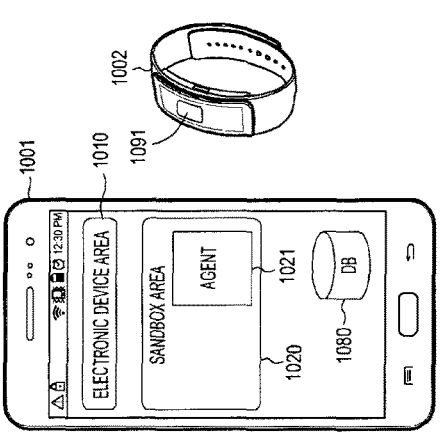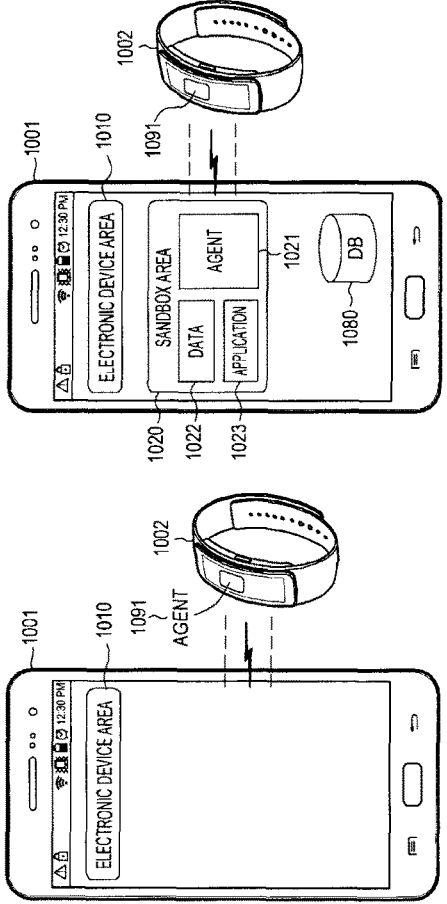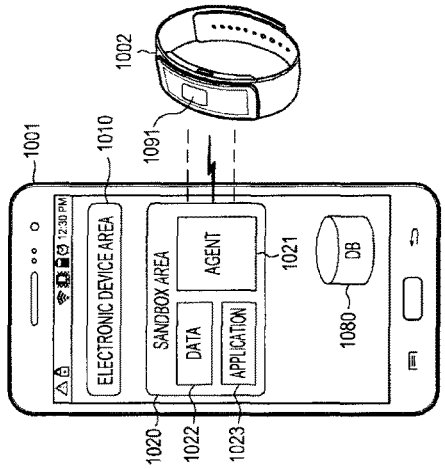

ELECTRONIC DEVICE AND METHOD FOR PROVIDING FUNCTION IN ELECTRONIC DEVICE

CLAIM OF PRIORITY

This application claims the priority under 35 U.S.C. § 119(a) to Korean Application Serial No. 10-2015-0082054, which was filed in the Korean Intellectual Property Office on Jun. 10, 2015, the entire content of which is hereby incorporated by reference.

BACKGROUND

1. Field of the Disclosure

The present disclosure relates to electronic devices, in general, and more specifically to an electronic device and a method for providing a function in the electronic device.

2. Description of the Related Art

Recently, the remarkable development of an information communication technology and a semiconductor technology has rapidly increased the spread and use of various electronic devices. In particular, recently developed electronic devices enable a user to perform communication while carrying them.

For example, electronic devices provide additional functions, such as an alarm, a short messaging service (SMS), a multimedia message service (MMS), E-mail, a game, remote control of short range communication, an image capturing function using a mounted digital camera, a multimedia function for providing an audio and video content, a scheduling function, and other similar functions.

Further, the electronic devices may download, install, and execute applications which can provide the above-described functions or other functions on the electronic devices. For example, such applications may include a music reproducing application, a video reproducing application, a photo gallery application, a game application, a social networking application, an Internet browsing application, a file management application, an application having a cloud function, and other similar applications.

Meanwhile, by grouping applications to be included in a sandbox, when an operating system (OS) of an electronic device, for example, an Android OS or any other similar OS, performs runtime or execution of the grouped applications, the grouped applications within the sandbox and application data and code relating to each of the applications can be separated from the remaining applications of the electronic device. Therefore, the applications within the sandbox may be configured to be shared only with other applications included in the sandbox.

SUMMARY

According to aspects of the disclosure, an electronic device is provided comprising: a memory including a first memory area associated with a first application; and at least one processor operatively coupled to the memory, configured to: detect that a connection is established between the electronic device and an external electronic device; and allocate a second memory area in the memory in response to detecting that the connection is established.

According to aspects of the disclosure, a method is provided for use in a portable electronic device having a memory including a first memory area, the method comprising: detecting that a connection is established between the portable electronic device and an external electronic device; and allocating a second memory area in the memory in response to detecting that the connection is established.

According to aspects of the disclosure, a non-transitory computer-readable medium is provided that stores one or more processor-executable instructions, which when executed by at least one processor cause the processor to execute a method comprising the steps of: allocating a first memory area; detecting that a connection is established between an electronic device and an external electronic device; and allocating a second memory area in response to detecting that the connection is established.

According to aspects of the disclosure, a portable electronic device is provided, comprising: a communication module; a memory including a first area allocated to the portable electronic device; and at least one processor operatively coupled to the memory, configured to: detect that a connection is established between the portable electronic device and an external electronic device, the connection being established by using the communication module; and allocate a second memory area in the memory in response to detecting that the connection is established.

According to aspects of the disclosure, a portable electronic device is provided, comprising: a communication module; and a memory that includes a first area corresponding to the portable electronic device and a second area corresponding to an external electronic device, at least one processor operatively coupled to the memory, configured to: allocate the second area in response to a connection being established between the portable electronic device and the external electronic device, the connection being established by using the communication module.

BRIEF DESCRIPTION OF THE DRAWINGS

The above and other aspects, features, and advantages of the present disclosure will be more apparent from the following detailed description taken in conjunction with the accompanying drawings, in which:

FIG. 10A is a diagram of an example of a system including an electronic device and an external electronic device, according to various embodiments of the present disclosure;

FIG. 10B is a diagram of an example of a system including an electronic device and an external electronic device, according to various embodiments of the present disclosure;

FIG. 10C is a diagram of an example of a system including an electronic device and an external electronic device, according to various embodiments of the present disclosure;

FIG. 10D is a diagram of an example of a system including an electronic device and an external electronic device, according to various embodiments of the present disclosure;

FIG. 11A is a diagram of an example of a system including an electronic device and an external electronic device, according to various embodiments of the present disclosure;

FIG. 11B is a diagram of an example of a system including an electronic device and an external electronic device, according to various embodiments of the present disclosure;

FIG. 11C is a diagram of an example of a system including an electronic device and an external electronic device, according to various embodiments of the present disclosure;

FIG. 11D is a diagram of an example of a system including an electronic device and an external electronic device, according to various embodiments of the present disclosure;

FIG. 12A is a diagram of an example of a system including an electronic device and an external electronic device, according to various embodiments of the present disclosure;

FIG. 12B is a diagram of an example of a system including an electronic device and an external electronic device, according to various embodiments of the present disclosure;

FIG. 12C is a diagram of an example of a system including an electronic device and an external electronic device, according to various embodiments of the present disclosure;

FIG. 12D is a diagram of an example of a system including an electronic device and an external electronic device, according to various embodiments of the present disclosure;

FIG. 14A is a diagram of an example of a system including an electronic device and an external electronic device, according to various embodiments of the present disclosure;

FIG. 14B is a diagram of an example of a system including an electronic device and an external electronic device, according to various embodiments of the present disclosure;

FIG. 14C is a diagram of an example of a system including an electronic device and an external electronic device, according to various embodiments of the present disclosure;

FIG. 14D is a diagram of an example of a system including an electronic device and an external electronic device, according to various embodiments of the present disclosure;

FIG. 14E is a diagram of an example of a system including an electronic device and an external electronic device, according to various embodiments of the present disclosure;

FIG. 14F is a diagram of an example of a system including an electronic device and an external electronic device, according to various embodiments of the present disclosure;

DETAILED DESCRIPTION

Figure 1:
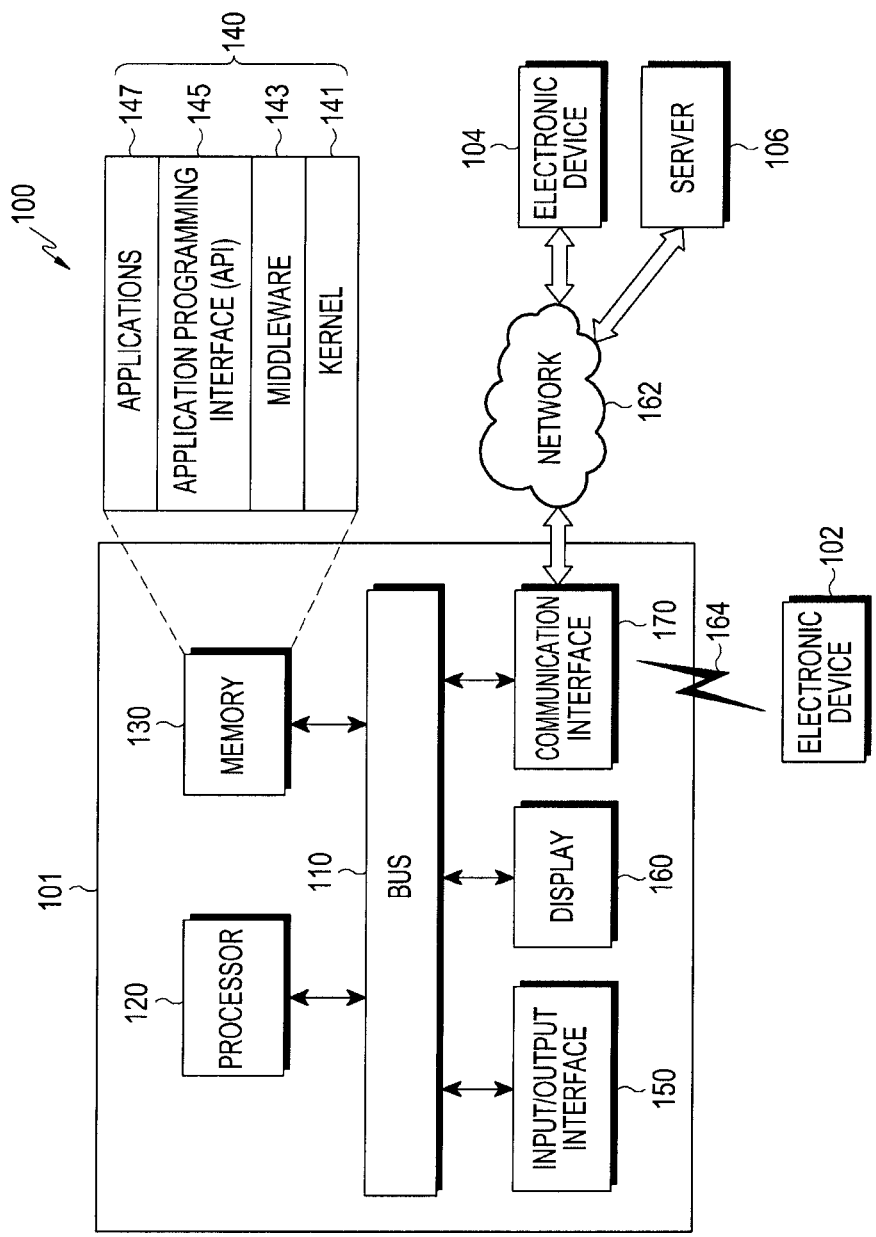
FIG. 1 is a diagram of an example of a network environment including an electronic device, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wavemeter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment 100 including an electronic device 101, according to various embodiments of the present disclosure. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for interconnecting the elements 110 to 170 and transferring communication (e.g., control messages and/or data) between the elements.

The processor 120 may include at least one processor. The at least one processor may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In some implementations, the processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or an application program (or "application") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output instructions or data received from the other element(s) of the electronic device 101 to the user or the other external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, the "GPS" may be used interchangeably used with the "GNSS" in the present disclosure. The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
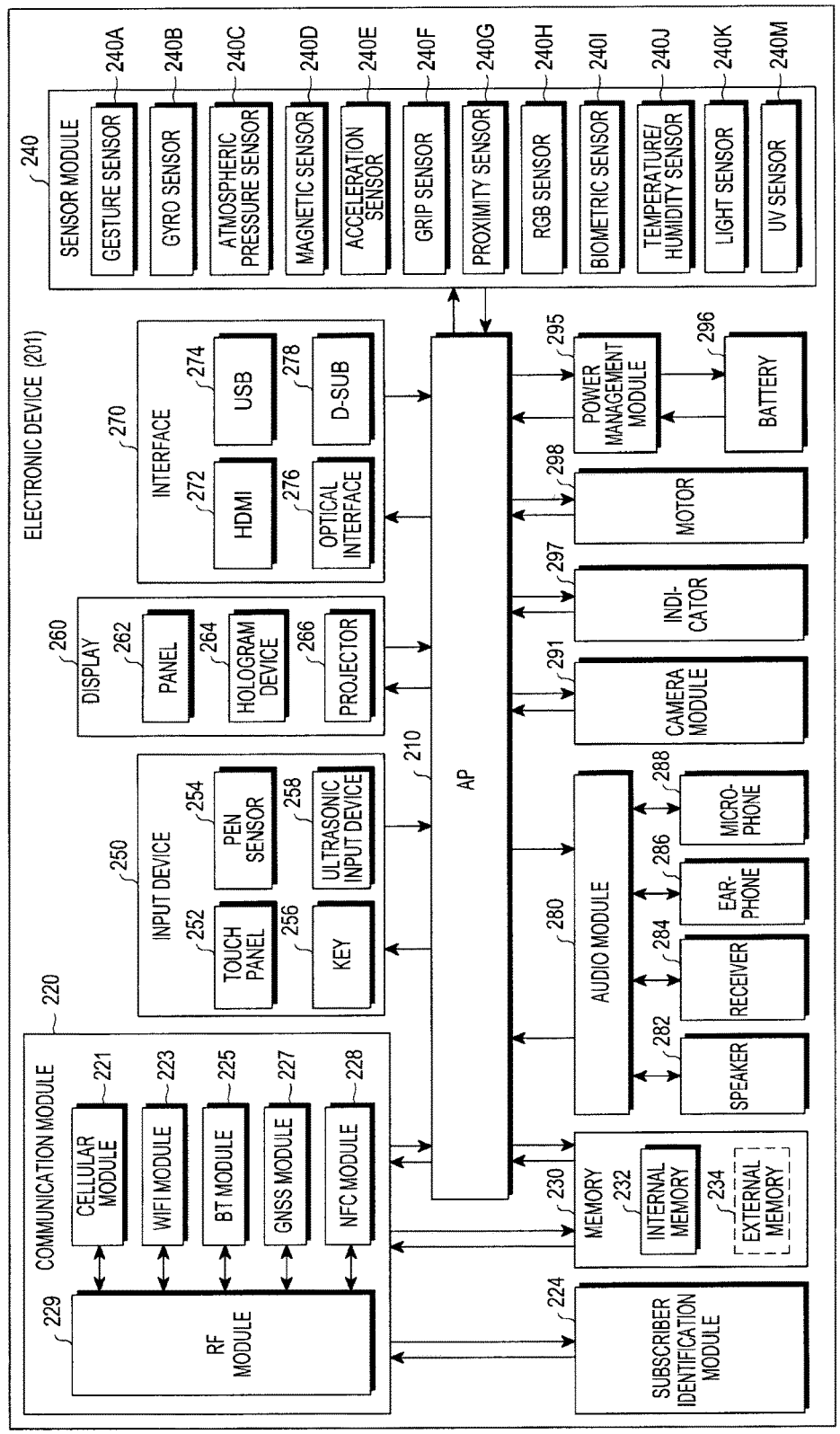
FIG. 2 is a block diagram of an example of an electronic device, according to various embodiments of the present disclosure.

FIG. 2 is a block diagram of an example of an electronic device 201, according to various embodiments of the present disclosure. For example, the electronic device 201 may include the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment of the present disclosure, the cellular module 221 may include a Communication Processor (CP).

The Wi-Fi module 223, the Bluetooth module 225, the GNSS module 227, or the NFC module 228 may include, for example, a processor that processes data transmitted and received through the corresponding module. According to an embodiment of the present disclosure, at least some (two or more) of the cellular module 221, the Wi-Fi module 223, the BT module 225, the GNSS module 227, and the NFC module 228 may be included in one Integrated Chip (IC) or IC package. According to various embodiments of the present disclosure, each of the WI-Fi module 223, the Bluetooth module 225, the GNSS module 227, and the NFC module 228 may connect the electronic device 101 and other electronic devices (e.g., electronic devices 102 and 104, or the server 106) through communication.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain a unique identification identifier (e.g., an Integrated Circuit Card Identifier (ICCID)) or subscriber identifier (e.g., an International Mobile Subscriber Identity (IMSI)).

The memory 230 (for example, the memory 130) may include, for example, an internal memory 232 or an external memory 234. The embedded memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

An external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three-dimensional image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, the power supply of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (e.g., a booting state, a message state, a charging state, or the like) of the electronic device 201 or a part (e.g., the processor 210) of the electronic device 2201. The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
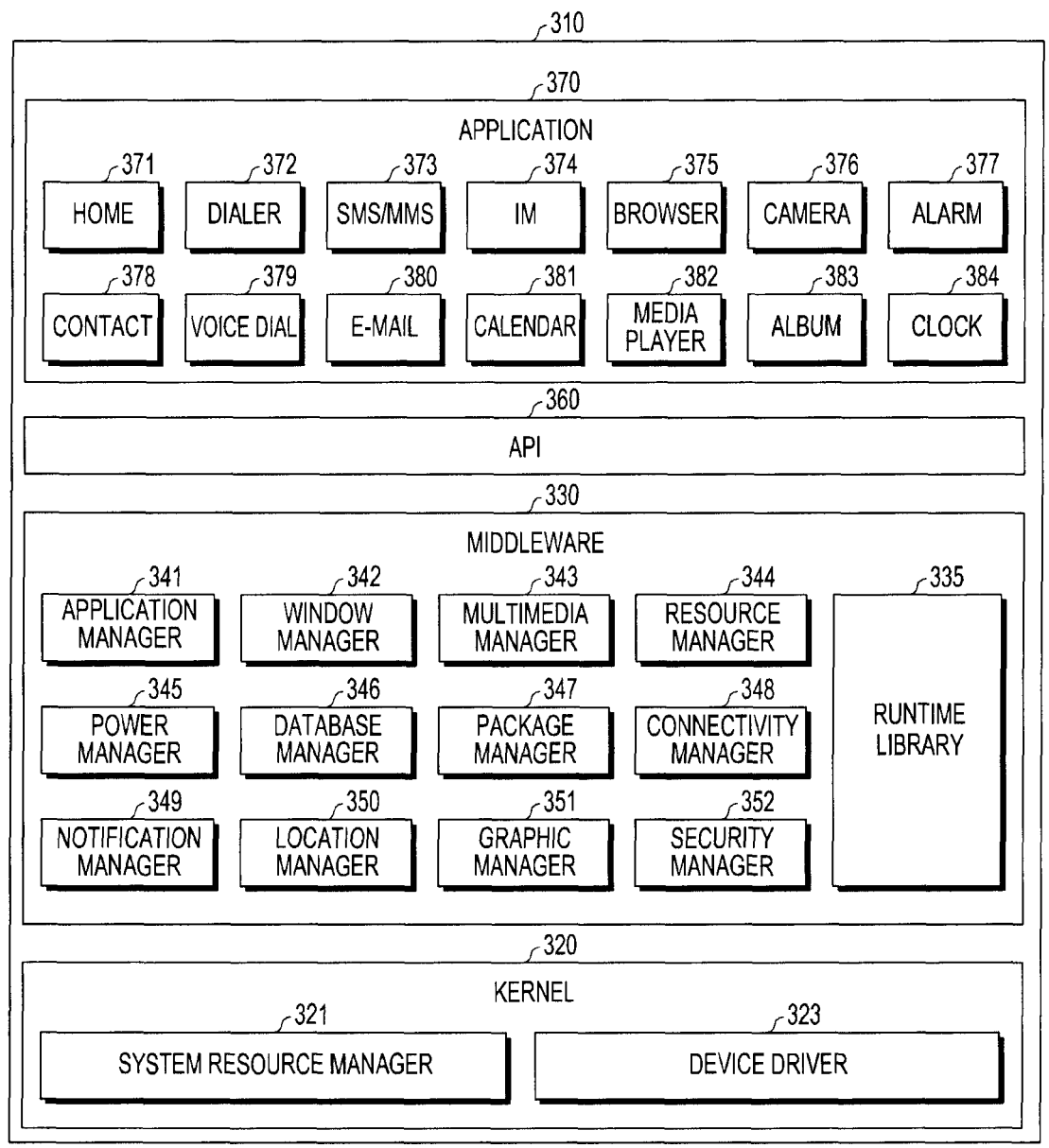
FIG. 3 is a block diagram of an example of a program module, according to various embodiments of the present disclosure.

FIG. 3 is a block diagram of an example of a program module, according to various embodiments of the present disclosure. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104, or the server 106).

The kernel 320 (for example, the kernel 141) may include, for example, a system resource manager 321 and/or a device driver 323. The system resource manager 321 may control, assign, or collect system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may, for example, manage a life cycle of at least one of the applications 370. The window manager 342 may manage Graphical User Interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information required for the operation of the electronic device. The database manager 346 may generate, search, or change a database to be used in at least one of the applications 370. The package manager 347 may manage the installation or the updating of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment of the present disclosure, when the electronic device (for example, the electronic device 101) has a telephone function, the middleware 330 may further include a telephony manager for managing a voice call function or a video call function of the electronic device.

The middleware 330 may include a middleware module that forms combinations of various functions of the above-described elements. The middleware 330 may provide specialized modules according to types of operating systems in order to provide differentiated functions. Furthermore, the middleware 330 may dynamically remove some of the existing elements, or may add new elements.

The API 360 (e.g., the API 145) is, for example, a set of API programming functions, and may be provided with a different configuration according to an OS. For example, in the case of Android or iOS, one API set may be provided for each platform, and in the case of Tizen, two or more API sets may be provided for each platform.

The applications 370 (e.g., the application programs 147) may include, for example, one or more applications that can perform functions, such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384, health care (e.g., measure exercise quantity or blood sugar), or environment information (e.g., an indication of atmospheric pressure, humidity, temperature, etc.).

According to an embodiment of the present disclosure, the applications 370 may include an application (hereinafter, referred to as an "information exchange application" for convenience of description) supporting information exchange between the electronic device (e.g., the electronic device 101) and an external electronic device (e.g., the electronic device 102 or 104). The application associated with exchanging information may include, for example, a notification relay application for notifying an external electronic device of certain information or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, the external electronic device and provide the received notification information to the user.

For example, the device management application may manage (for example, install, delete, or update) at least one function of an external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic device (e.g., the server 106, or the electronic device 102 or 104). According to an embodiment, the applications 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least a part of the program module 310 may include, for example, a module, a program, a routine, a set of instructions, and/or a process for performing one or more functions.

Figure 4:
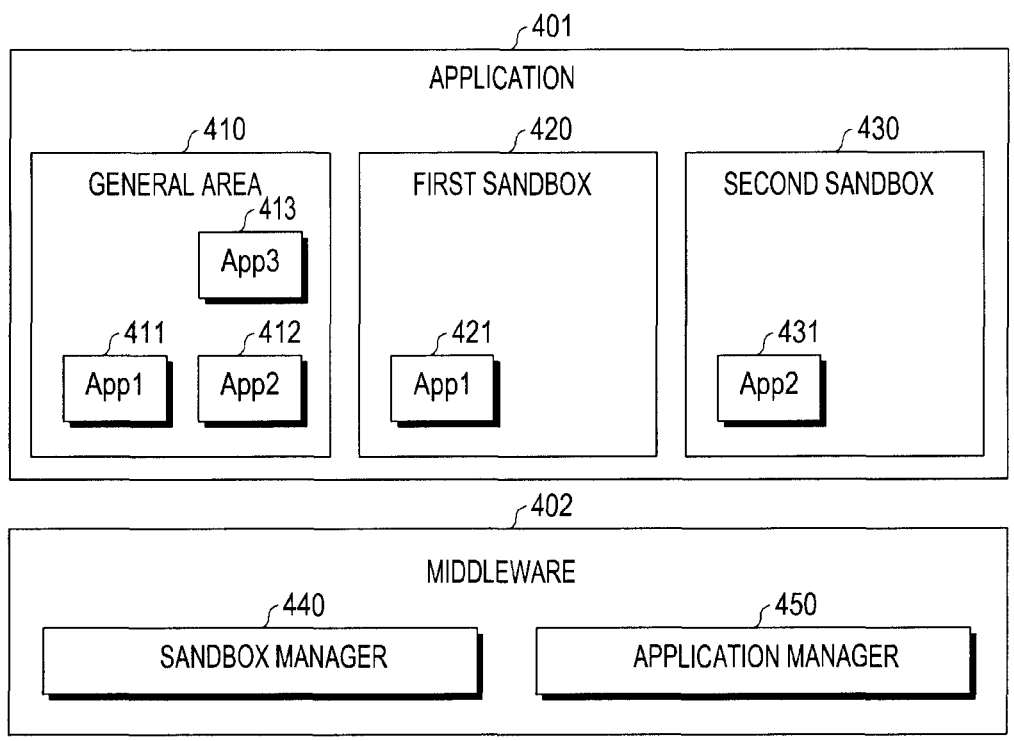
FIG. 4 is a block diagram of an example of a sandbox area, according to various embodiments of the present disclosure.

FIG. 4 is a block diagram of an example of a sandbox area that is allocated in the memory of an electronic device, according to various embodiments of the present disclosure;

Referring to FIG. 4, an application layer 401 may be a layer in which an application is installed and executed and may be set as an area in which data required to execute the application can be stored and processed. The application layer 401 may transmit/receive data to/from a middleware layer 402.

According to aspects of the disclosure, a general area 410, a first sandbox 420, and a second sandbox 430 may be set in the application layer 401. According to various embodiments of the present disclosure, the number of sandboxes may be defined to be one or more.

The sandbox may be referred to as a security area, a container, a profile, etc. according to the implementation thereof. Each of the general area 410, the first sandbox 420, and the second sandbox 430 may be implemented using a memory area division scheme, may be implemented according to a user identifier, or may be implemented using one or more tags.

The general area 410 is allocated an application which is not required to be allocated to the sandbox. For example, an App3 413 may be an application of which security processing is not required or which is not executed while the electronic device is connected to an external device. Therefore, the App3 413 may be an application which is not required to be allocated to the sandbox. The App3 413 may be installed (e.g., instantiated) in the general area 410. The App3 413 may share data and/or code with another application in the general area 410, as opposed to an application allocated to the sandbox.

According to various embodiments of the present disclosure, applications installed (e.g., instantiated) in the general area 410 may share data and/or code with other applications installed (e.g., instantiated) in the general area 410, and applications installed (e.g., instantiated) in each sandbox may share data and/or code with applications installed (e.g., instantiated) in each sandbox. For example, the App3 413 may share data and/or code with an App1 411 and an App2 412 in general area 410 but may not share data and/or code with an App1 421 in first sandbox 420 and an App2 431 in second sandbox 430. According to aspects of the disclosure, as specifically described later, in various embodiments of the present disclosure, a general area, a sandbox, etc. may be referred to as an environment.

The App1 421 may be installed (e.g., instantiated) in the first sandbox 420. In the sandbox, unlike the general area, an application of which security processing is required may be allocated or executed. For example, the App1 421 may input/output data of which security processing is required, and data of the App1 421 of which security processing is required may be stored or processed a resource (for example, an exclusive memory space or the like) which corresponds to the first sandbox. The App1 431 may be installed (e.g., instantiated) in the second sandbox 430. The App2 431 may be, for example, an application of which security processing is required and which is not permitted to share data with the App1 421. The electronic device 101 may allocate the App1 421 to the first sandbox 420 and separately allocate the App2 431 to the second sandbox 430, in order to prevent the App1 421 and the 431 from sharing data and/or code. For example, the App1 421 may share data and/or code only in the first sandbox 420 and may not share the data and/or code with applications in the general area 410 and the second sandbox 430. The App2 431 may not share data and/or code with the App1 421 in the first sandbox 420 and the App2 431 in the second sandbox 430.

The App1 411 allocated to the general area 410 and the App1 421 allocated to the first sandbox 420 may have one or more different characteristics (for example, different storage areas, different user identifiers, or one or more different tags) while having the same package identifier or the same application identifier. According to aspects of the disclosure, the electronic device 101 may display an execution screen for an application, for example, a launcher application screen. The electronic device 101 according to various embodiments of the present disclosure may cause an application of a sandbox connected to an external device to not be displayed on a screen or cause the application of a sandbox connected to an external device to be displayed on a separate screen that is activated through the input of a password.

The middleware 402 may adjust the setting of the electronic device 101 according to a request of a particular module, generate a sandbox, and allocate an application.

A sandbox manager 440 may manage the generation and deletion of a sandbox. An application manager 450 may manage the installation (e.g., instantiation) and execution of an application and may determine the allocation location of the application. For example, the application manager 450 may determine the allocation location of the App1 421 to be the first sandbox 420 and may allocate the App1 421 to the first sandbox 420 when downloading the App1 421.

Figure 5A:
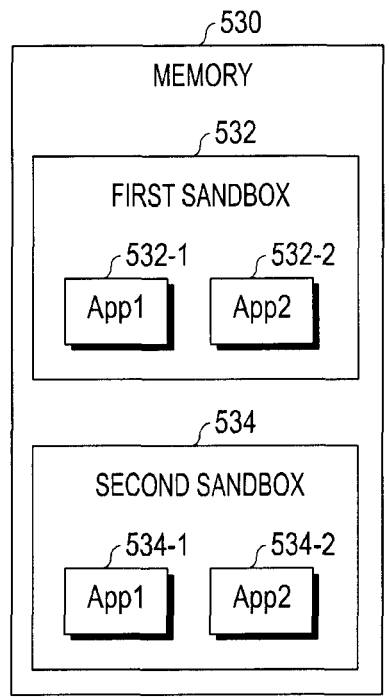
FIG. 5A is a diagram of an example of a sandbox using a memory area division scheme, according to various embodiments of the present disclosure.

FIG. 5A is a diagram of an example of a sandbox using a memory area division scheme, according to various embodiments of the present disclosure. As illustrated, areas for one or more sandboxes may be allocated to a memory 530 of an electronic device. For example, the processor may allocate a first area of the memory 530 as a first sandbox area 532 and allocate a second area of the memory 530 as a second sandbox area 534. One or more applications may be installed (e.g., instantiated) in each of the first sandbox area 532 and the second sandbox area 534. The applications (App1, App2) installed in each of the first and second sandbox areas 532 and 534 may share data and/or code with applications installed in each of the sandboxes. For example, an App1 532-1 may share data and/or code with an App2 532-2 but may not share the data and/or code with an App1 534-1 and an App2 534-2 of the second sandbox area 534.

Figure 5B:
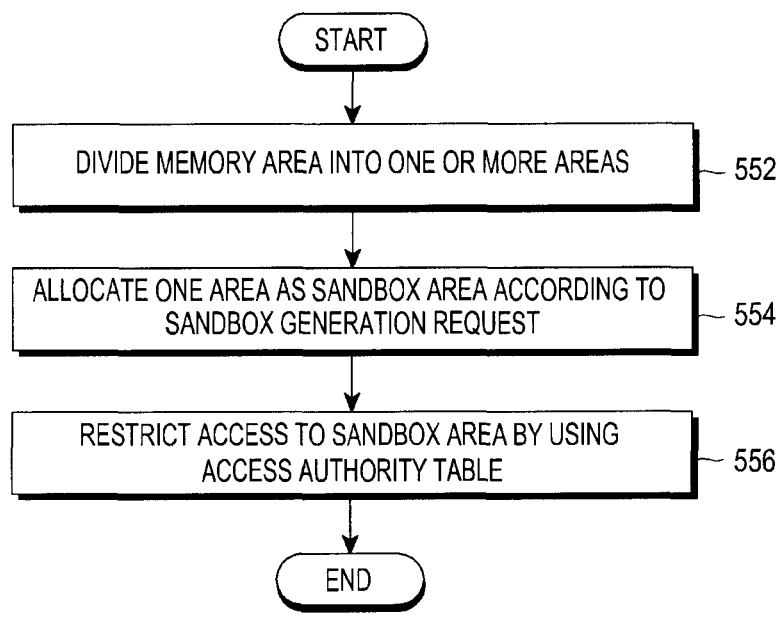
FIG. 5B is a flowchart of an example of a process, according to various embodiments of the present disclosure.

FIG. 5B is a flowchart of an example of a process, according to various embodiments of the present disclosure. As illustrated in FIG. 5B, in operation 552, the processor may divide the memory 530 into one or more areas. In operation 554, the processor may use one of the areas as a sandbox area according to a corresponding request. According to various embodiments of the present disclosure, when there is a request for a plurality of sandboxes, a plurality of areas may be allocated as the plurality of sandboxes. In operation 556, the processor may set a restriction on access to each sandbox area with reference to an access authority table according to each area. As the restriction on access to each sandbox is set, applications installed (e.g., instantiated) in each sandbox area may share data and/or code with the applications installed (instantiated) in each sandbox area or may be restricted in sharing the data and/or code with applications installed in other sandbox areas.

Figure 6:
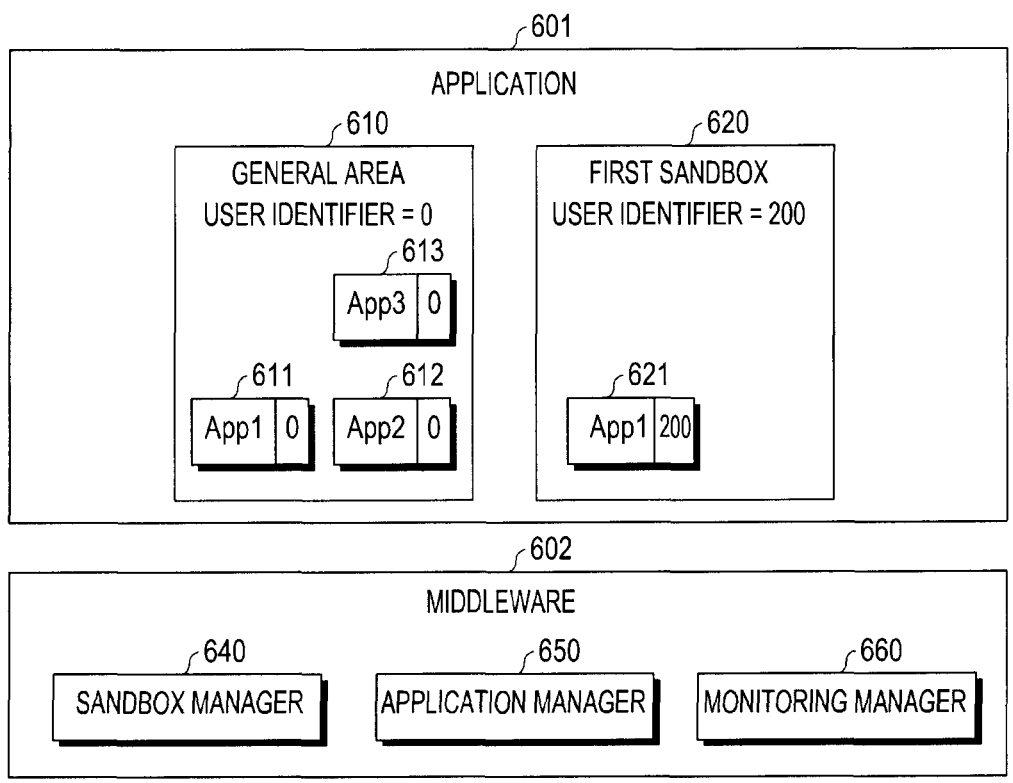
FIG. 6 is a diagram of an example of a sandbox using a user identifier, according to various embodiments the present disclosure.

FIG. 6 is a diagram of an example of a sandbox using a user identifier, according to various embodiments the present disclosure. As illustrated in FIG. 6, the sandbox may be implemented by using the user ID. For example, a general area 610 may correspond to a user ID "0" and a sandbox 620 may be generated so that the sandbox 620 corresponds to a user ID "200" so as to be distinguishable from the general area 610. A separate memory area may be allocated according to each user ID. The above-described ID number may be only exemplary. Each of applications 611, 612, 613, and 621 may have a user ID set therein and may be installed in an area corresponding to the set user ID. For example, an App1 to an App3, 611, 612 and 613, of which user IDs are "0", may be installed in the general area 610 and an App1 624, of which a user ID is "200", may be installed in the sandbox 620. When there is a data request or a function execution request, each of the applications 611, 612, 613, and 621 may permit only a data request and function execution request which is made by an application having the same user ID, and may not permit a data request and function request which is made by another application having another user ID. The permission and non-permission for the data request and function execution request, using the user ID, may be managed by a sandbox manager 640 or separate monitoring manager 660 in a middleware layer 602 or by an access control module of a kernel. According to aspects of the disclosure, similarly to applications, a user ID may also be allocated to one or more files so as to enable access control management for the data.

The middleware 602 may adjust the setting of the electronic device in response to a request made by a particular module, generate a sandbox, and allocate an application.

The sandbox manager 640 may manage the generation and deletion of a sandbox. The sandbox manager 640 may manage a user ID, such as generating or deleting the user ID.

An application manager 650 may install or move an application. The application manager 650 may manage the installation and execution of an application according to the user ID and may determine the allocation location of the application. For example, the application manager 650 may determine the allocation location of the App1 624 to be the first sandbox 620 and may allocate the App1 624 to the first sandbox 620 when downloading the App1 624.

A monitoring manager 660 may control access by an application. The monitoring manager 660 may determine a user ID of an object which each application attempts to access and determine whether to allow an access subject to access the object.

Figure 7:
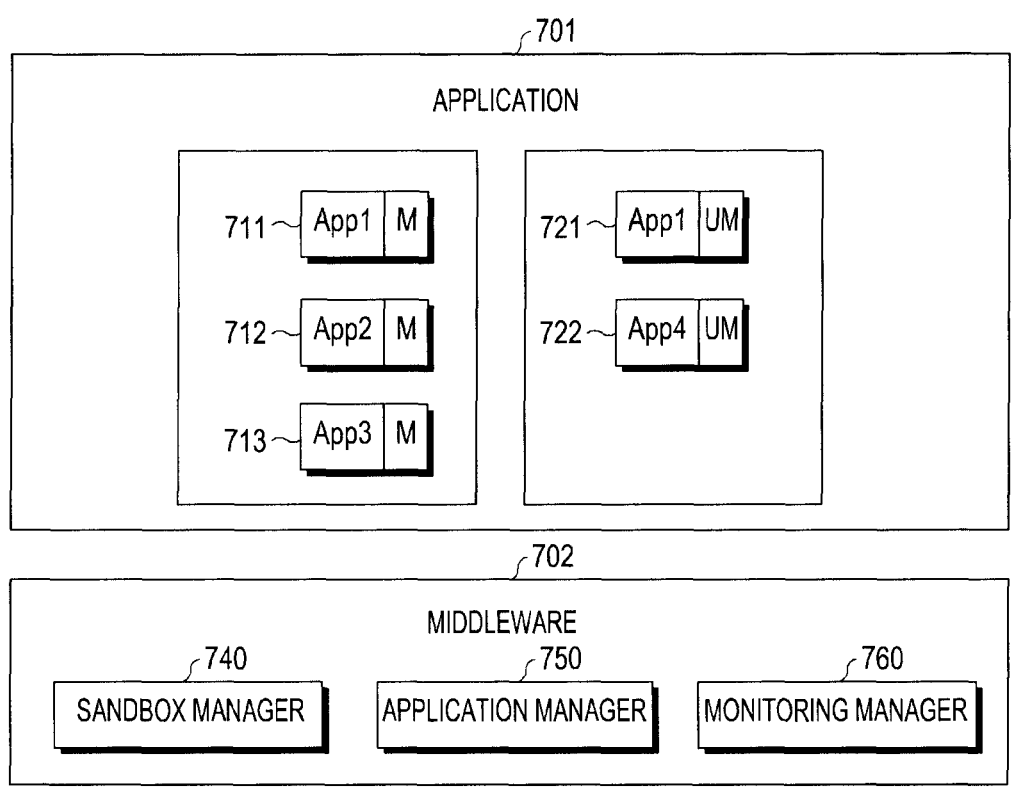
FIG. 7 is a diagram of an example of a sandbox using tag information, according to various embodiments the present disclosure.

FIG. 7 is a diagram of an example of a sandbox using tag information, according to various embodiments the present disclosure. According to aspects of the disclosure, the sandbox may be allocated in the memory of an electronic device. As illustrated in FIG. 7, the sandbox may be implemented by using tag information. For example, the information may include an M-tag (e.g., a tag containing the letter "M") indicating "Managed" or an UM-tag (e.g., a tag containing the letters "UM") indicating "UnManaged". According to an embodiment, an M-tag may be a tag indicating an application which is installed by a predesignated server, for example, an enterprise application server or a Mobile Device Management (MDM), in a push scheme or a particular path. A UM-tag may be a tag indicating an application which is installed through a general application server other than a predesignated server or a path other than a particular path. According to an embodiment, an application in which one of an M-tag and a UM-tag is set may be installed in a sandbox so as to be executed while being connected to an external electronic device. For example, applications 711, 712, and 713, in which an M-tag is set, may be applications executed while being connected to an external electronic device, and applications 721 and 722, in which a UM-tag is set, may be applications executed while being connected to the external electronic device.

According to various embodiments of the present disclosure, it is possible to distinguish between an area where the applications 711, 712, and 713, in which an M-tag is set, are executed and an area where the applications 721 and 722, in which a UM-tag is set, are executed. Further, the applications 711, 712, and 713, in which the M-tag is set, may share data and/or code only with the applications 711, 712, and 713, in which the M-tag is set. The applications 721 and 722, in which the UM-tag is set, may share data and/or code only with the applications 721 and 722, in which the UM-tag is set. According to an embodiment, an area where the applications 711, 712, and 713, in which an M-tag is set, are executed and an area where the applications 721 and 722, in which a UM-tag is set, are executed may be separate memory areas; and the applications 711, 712, and 713, in which the M-tag is set, and the applications 721 and 722, in which the UM-tag is set, may be installed in separate memory areas.

While the electronic device is connected to the external electronic device, a monitoring manager 760 may determine which of an M-tag or a UM-tag is set in an application that is currently being executed. For example, when there is a request for connection with an external electronic device, the monitoring manager 760 may notify, to an application manager 750, that one of the applications 711, 712, and 713, in which an M-tag is set, will be executed while the electronic device is connected to the external electronic device, or notify, to the application manager 750, that one of applications 721 and 722, in which a UM-tag is set, will be executed while the electronic device is connected to the external electronic device. According to an embodiment, when an application in which an M-tag is set accesses an application in which a UM-tag is set or when the application in which the UM-tag is set accesses the application in which the M-tag is set, the monitoring manager 760 may determine whether the access is permissible.

According to various embodiments of the present disclosure, the electronic device 101 may set a sandbox to which applications) are allocated that are separated from a function of the electronic device 101 and are executed while the electronic device 101 is connected to an external electronic device (e.g. the electronic device 102 or 104.

Figure 8:
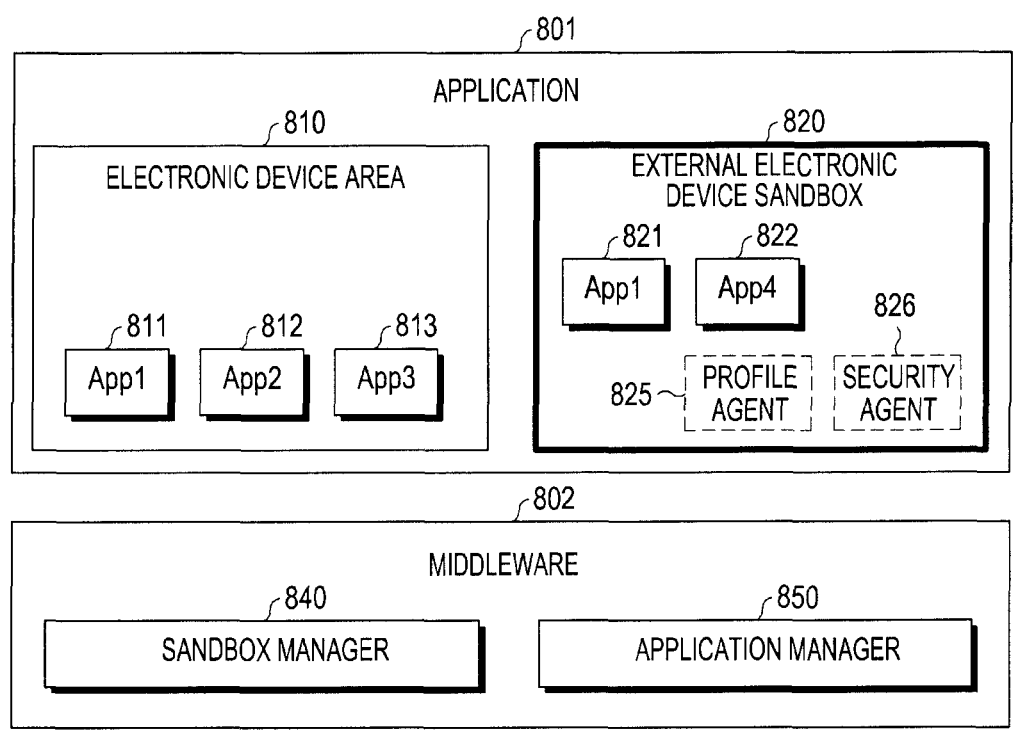
FIG. 8 is a block diagram of an example of an external electronic device sandbox area set in an electronic device, according to various embodiments of the present disclosure.

FIG. 8 is a block diagram of an example of an external electronic device sandbox area set in an electronic device, according to various embodiments of the present disclosure. As illustrated in FIG. 8, an application layer 801 may be a layer in which an application is installed and executed and may be set as an area in which data required to execute the application can be stored and processed. The application layer 801 may transmit/receive data to/from a middleware layer 802.

An electronic device area 810 for providing a function of the electronic device 101 and an external electronic device sandbox 820 for providing a function of the external electronic device 102 or 104 may be set within the application layer 801. In other words, the application layer 801 may include: the electronic device area 810 where an application, which does not interact with the external electronic device 102 or 104, is installed; and the external electronic device sandbox 820 where an application, which interacts with the external electronic device 102 or 104, is installed and operated. According to various embodiments of the present disclosure, the number of external electronic device sandboxes may be defined to be one or more.

According to an embodiment, an electronic device area may be a first area and an external electronic device area may be a second area. According to an embodiment, the first area may be a portable electronic device area and the second area may be a portable external electronic device area.

The external electronic device sandbox 820 may be referred to as a security area, a container, a profile, etc. according to the implementation thereof. Any of the electronic device area 810 and the external electronic device sandbox 820 may be associated with a respective memory area, a respective user ID, and one or more respective tags.

One or more applications 811, 812, and 813 of the electronic device may be allocated to the electronic device area 810. For example, the App3 813 may be an application used without being connected to an external electronic device. Therefore, the App3 813 may be an application which is not required to be allocated to a sandbox connected to the external electronic device. The App3 813 may be installed in the electronic device area 810 of the application layer 801. The App3 813 may share data and/or code with another application in the electronic device area 810. For example, the App3 813 may share data and/or code with an App1 811 and an App2 812 in the electronic device area 810 but may not share the data and/or code with an App1 821 and an App4 822 in the external electronic device sandbox 820. According to aspects of the disclosure, as specifically described later on, according to various embodiments of the present disclosure, an electronic device area may be referred to as an electronic device environment and an external electronic device sandbox may be referred to as an external electronic device environment.

Each of the App1 821 and the App4 822 may be installed in the external electronic device sandbox 820. In the external electronic device sandbox 820 which is distinguished from the electronic device area 810, an application of an external electronic device, which does not share data with the applications of the electronic device area 810, may be allocated or executed. For example, the App1 821 may input/output data required for an external electronic device, and data of the App1 821 which provides a function for the external electronic device may be stored or processed in a resource, which corresponds to the external electronic device sandbox 820, for example, an exclusive memory space or the like.

The App1 811 allocated to the electronic device area 810 and the App1 821 allocated to the external electronic device sandbox 820 may be allocated to different memory areas or have different user IDs or different tags, while having the same package identifier or the same application identifier, and therefore may be operated by different applications.

According to aspects of the disclosure, the electronic device 101 may display an execution screen for an application, for example, a launcher application screen. According to various embodiments of the present disclosure, the electronic device 101 may cause an application, which is allocated to the electronic device area 810 to be displayed, and cause an application, which is allocated to the external electronic device sandbox 820 connected to an external electronic device, to not be displayed. Further, the electronic device 101 may cause the application, which is allocated to the external electronic device sandbox 820 connected to the external electronic device, to be displayed on a separate screen that is accessible by a user through the input of a password.

The middleware 802 may adjust the setting of the electronic device 101 in response to a request by a particular module, generate the external electronic device sandbox 820, and allocate an application.

A sandbox manager 840 may manage the generation and deletion of an external electronic device sandbox. An application manager 850 may manage the installation and execution of an application and may determine the allocation location of the application. For example, the application manager 850 may determine the allocation location of one or more of the App1 811, App2 812 and App 813 to be the electronic device area 810 and may allocate one or more of the App1 811, App2 812 and App3 813 to the electronic device area 810 when downloading one or more of the App1 811, App2 812 and App3 813. The application manager 850 may determine the allocation location of one or more of the App1 821 and App4 822 to be the external electronic device sandbox 820 and may allocate one or more of the App1 821 and App4 822 to the external electronic device sandbox 820 when downloading one or more of the App1 821 and App4 822. According to an embodiment, the allocation location of one or more of the App1 821 and App4 822 may be determined by the sandbox manager 840.

The application manager 850 may allocate the App1 821 or the App4 822 within the external electronic device sandbox 820 while installing them in response to an installation request made by a profile agent 825. The application manager 850 may be configured as one module or one or more divided modules in a middleware. According to aspects of the disclosure, in addition to including the profile agent 825, the external electronic device sandbox 820 may further include a security agent 826 which transmits an authentication request to a security server and receives an authentication result from the security server.

According to various embodiments of the present disclosure, the electronic device may include: a memory that includes a first area for a first application executed in the electronic device; and a processor, wherein the processor identifies that an external electronic device and the electronic device are functionally connected to each other and allocates, to the memory, a second area executed while interacting with the external electronic device, at least based on the identification.

According to various embodiments, the second area may be set not to share data with the first application.

According to various embodiments, the first area or the second area may be set on the basis of one of a memory area, a user ID, and tag information.

According to various embodiments, the second area may include a second application which has the same application identifier as an application identifier corresponding to the first application and has a user ID different from the user ID corresponding to the first application.

According to various embodiments, the second area may be set as a security area.

According to various embodiments, the processor may be configured to transfer data, which is processed by the second application operated in the second area, to the external electronic device.

According to various embodiments, the processor may be configured to install a profile agent program in the second area; receive data, which is processed by the second application executed while interacting with the external electronic device, from a profile server through the profile agent; and transfer the received data to the external electronic device.

According to various embodiments, the processor may stop transferring the data in response to a stop request made by one of the electronic device and the external electronic device and delete the second area of the memory.

According to various embodiments, the deleting of the second area is to delete data having a user ID allocated to the second area or to delete an application allocated to the second area.

According to various embodiments, the processor may stop transferring the data in response to communication disconnection between the electronic device and the external electronic device and delete the second area of the memory.

According to various embodiments, when communication between the electronic device and the external electronic device is disconnected for a longer time than a predetermined time, the processor may stop transferring the data and delete the second area of the memory.

According to various embodiments, data of the external electronic device and an agent of the second area may share a security key and a communication module that transmits/receives encoded data by using the security key may be further included.

According to various embodiments of the present disclosure, a portable electronic device may include: a communication module that is used for making a call; a memory that includes a first area allocated to the portable electronic device; and a processor, wherein the processor identifies that the portable electronic device and an external electronic device are functionally connected to each other; and allocates a second area, which is different from the first area, for the external electronic device, to the memory at least on the basis of the identification, and the external electronic device may include another portable electronic device.

According to various embodiments of the present disclosure, a portable electronic device may include: a communication module that is used for making a call; and a memory that includes a first area corresponding to the portable electronic device and a second area corresponding to an external electronic device, wherein the second area is allocated at least on the basis of connection between the portable electronic device and the external electronic device, and the external electronic device may include a wearable device.

According to various embodiments of the present disclosure, a method for providing a function in a portable electronic device including a memory including a corresponding first area may include: identifying that the portable electronic device and an external electronic device are functionally connected to each other; and allocating a second area, which is different from the first area, for the external electronic device, to the memory at least based on the identification.

According to various embodiments of the present disclosure, the method may further include: executing a first application, which corresponds to the portable electronic device, in the first area; and executing a second application, which corresponds to the external electronic device, in the second area.

According to various embodiments, the second area may be configured not to share data with the first application.

According to various embodiments, the first area or the second area may be configured on the basis of one of a memory area, a user ID, and tag information.

According to various embodiments, the second application may include an application which has the same application identifier as an application identifier corresponding to the at least one first application and has a user ID different from the user ID corresponding to the at least one first application.

According to various embodiments, an operation of transferring data, which is processed by at least one second application operated in the second area, to the external electronic device may be further included.

According to various embodiments, the method may further include: installing a profile agent program in the second area; receiving data, which is processed by a second application executed while interacting with the external electronic device, from a profile server through the profile agent program; and transferring the received data to the external electronic device.

According to various embodiments, the method may further include: stopping the transferring of the data in response to a stop request made by one of the electronic device and the external electronic device; and deleting the second area of the memory.

According to various embodiments, the deleting of the second area is to delete data having a user ID allocated to the second area or to delete an application allocated to the second area.

According to various embodiments, the method may further include: stopping the transferring of the data in response to communication disconnection between the electronic device and the external electronic device and deleting the second area of the memory.

According to various embodiments, when communication between the electronic device and the external electronic device is disconnected for a longer time than a predetermined time, the transferring of the data may be stopped and the second area of the memory may be deleted.

Figure 9:
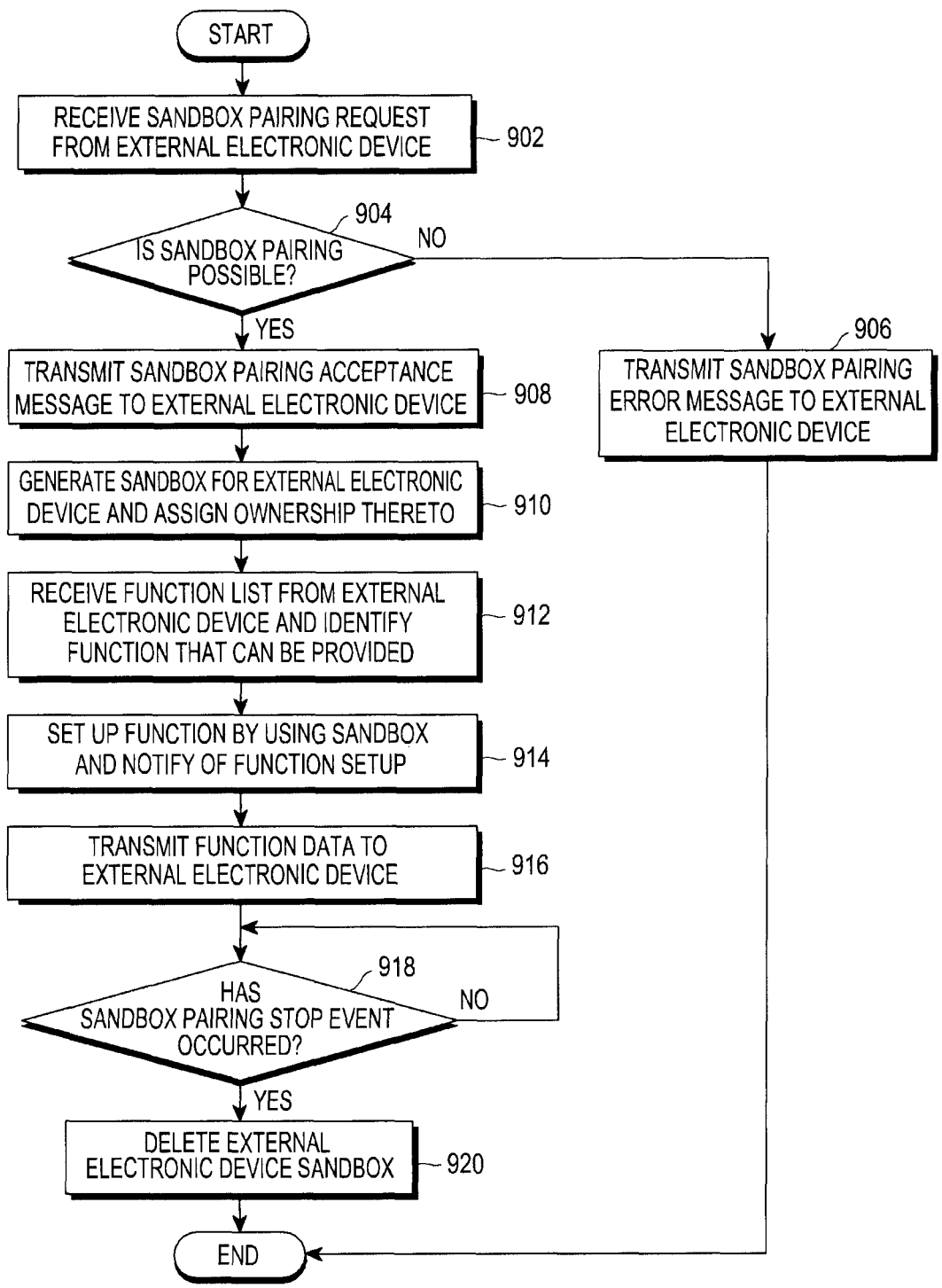
FIG. 9 is a flowchart of an example of a process, according to various embodiments of the present disclosure.

FIG. 9 is a flowchart of an example of a process, according to various embodiments of the present disclosure. As illustrated in FIG. 9, in operation 902, the electronic device may receive a sandbox pairing request from an external electronic device. According to various embodiments, the electronic device may receive the sandbox pairing request by using various communication schemes. The communication schemes may include a short range communication scheme, such as Bluetooth, Wi-Fi, WiGig, etc. In addition, other various communication schemes are available. The sandbox pairing request may mean that the external electronic device sends, to an application area of the electronic device, a request for a separate external device sandbox area, which is separate from the electronic device area, for a function of the external electronic device.

In operation 904, the electronic device may determine whether the sandbox pairing is possible. According to various embodiments, the electronic device may determine whether the sandbox pairing is possible according to various conditions, such as whether the external electronic device can be connected, whether the electronic device supports an external electronic device sandbox, and the like. For example, in the case where only one external electronic device is permitted to connect to the electronic device, if any external electronic device is already connected to the electronic device, the electronic device may determine a sandbox pairing to be impossible. Further, if the state of stored data does not support the external electronic device sandbox, the electronic device may determine a sandbox pairing to be impossible.

When the sandbox pairing is impossible, the electronic device may transmit, to the external electronic device, a message indicating that the sandbox pairing is impossible, in operation 906. When the sandbox pairing is possible, the electronic device may transmit a sandbox pairing acceptance message to the external electronic device in operation 908.

In operation 910, the electronic device may generate a sandbox associated with the external electronic device and assign ownership thereto. According to various embodiments, the electronic device may receive, from an external electronic device, at least one of external electronic device information and external electronic device user information, and environment information of the external electronic device; and may generate a sandbox for the external electronic device by using the received information.

According to various embodiments, the external electronic device information may be an external electronic device ID. The user information may be information on the external electronic device user's account. The external electronic device environment information may include a list of applications to be used while interacting with the external electronic device, an indication of a sandbox security level, or environment setting information (e.g. information on camera usage permission).

According to aspects of the disclosure, the electronic device may generate an external electronic device sandbox connected to the external electronic device and then perform ownership assignment which designates (or assigns) that the external electronic device or a user of the external electronic device has an authority to use the external electronic device sandbox. According to various embodiments, the electronic device may store a device ID or device key connected to a DB corresponding to a sandbox area within an electronic device managed by the sandbox manager 540. The electronic device may exchange a message with the external electronic device by using the device ID, or may encode and exchange a message by using a key.

In operation 912, the electronic device may receive a function list from the external electronic device and identify a function which can be provided.

According to various embodiments, the function list may include a list of applications which the external electronic device desires to receive through the external electronic device sandbox. For example, the electronic device may receive, from the external electronic device, a function list including information identifying at least one of a name and ID of an application which is executed through an external electronic device sandbox. When the function list is received, the electronic device may process the list to identify functions which can be supported by the present electronic device and functions which cannot be supported by the present electronic device.

In operation 914, the electronic device may set up a function and notify the external electronic device of function setup completion.

According to various embodiments, the electronic device may set up a function by installing an application corresponding to a supported function in an external electronic device sandbox, or may set up a function so as to receive a supported function from an external server through a profile agent.

According to an embodiment, when installing a supported application in an external electronic device sandbox, an electronic device may additionally install a preinstalled application in the external electronic device sandbox or may download a new application from an external application server and install the downloaded application in the external electronic device sandbox. Further, separately from user data of an application installed in the electronic device area, the electronic device may manage user data relating to the external electronic device in the external electronic device sandbox.

When the installation of an application corresponding to a supported function is completed, the electronic device may notify the external electronic device of function setup completion. According to an embodiment, when notifying the function setup completion, the electronic device may transmit a list of installed functions and a list of unsupported functions to the external electronic device.

When the setup of the external electronic device sandbox is completed, the electronic device may transmit data to the external electronic device in operation 916. According to an embodiment, each of applications installed in the external electronic device sandbox may communicate with the corresponding application server by using a communication unit of the electronic device and may exchange data, which is required for functions, with the corresponding application server. When data is generated in each of applications installed in the external electronic device sandbox, the electronic device may transmit the data to the external electronic device. As described above, if the external electronic device sandbox is used, the external electronic device may perform pairing through another user's electronic device other than the same user's electronic device which is permitted to be paired with the external electronic device, and may receive a function through the external electronic device sandbox of the another user's electronic device which is paired with the external electronic device.

The electronic device may determine, in operation 918, whether a sandbox pairing stop event occurs while receiving functions. According to various embodiments, the sandbox pairing stop event may occur when an electronic device user requests a sandbox pairing stop, when an external electronic device user requests a sandbox pairing stop, or when the electronic device and the external electronic device are disconnected from each other. In addition, the sandbox pairing stop event may occur according to various other conditions.

When a sandbox pairing stop event occurs, the electronic device may delete the external electronic device sandbox in operation 920. According to an embodiment, when an event of a sandbox pairing stop request by an electronic device user occurs, the electronic device may notify the external electronic device that a sandbox pairing is stopped, and delete the external electronic device sandbox. According to an embodiment, when an event of a sandbox pairing stop request by the external electronic device occurs, the electronic device may delete the external electronic device sandbox in response to the request. According to an embodiment, when the electronic device is disconnected from the external electronic device and then not reconnected with the external electronic device for a predetermined time, the electronic device may delete the external electronic device sandbox. According to an embodiment, when disconnected from the external electronic device, the electronic device may notify both the electronic device user and the external electronic device user of the disconnection, and delete the external electronic device sandbox according to a selection by one of the electronic device user and the external electronic device user. When the external electronic device sandbox is deleted, an application installed in the external electronic device sandbox may be deleted and an application use environment may be terminated.

FIGS. 10A-14E illustrate various examples of a system including an electronic device and an external electronic device, according to various embodiments of the present disclosure. As illustrated in FIG. 10A-D, when a connection request for a sandbox pairing is received, as described in FIG. 10A, from an external electronic device 1002, an electronic device 1001 may generate, as described in FIG. 10B, a sandbox area 1020 for the external electronic device 1002. The electronic device 1001 may set environment information of the sandbox area 1020 on the basis of an environment of the external electronic device 1002, and install an agent 1021, which can interact with an agent 1091 of the external electronic device 1002, in the sandbox area 1020. Further, the electronic device 1001 may install, in the sandbox area 1020, at least one application 1023 to be used while interacting with the external electronic device 1002 and store data 1022 in the sandbox area 1020. According to aspects of the disclosure, "an application to be used while interacting with the external electronic device" may include any suitable type of application that is arranged to transmit and/or receive data from the external device when the application is executed. The electronic device 1001 may receive, as described in FIG. 10C, a disconnection request corresponding to a sandbox pairing stop while functions are performed through at least one application 1023 to be used while interacting with the external electronic device 1002. When the disconnection request is received, the electronic device 1001 may delete, as described FIG. 10D, the sandbox area 1020. According to an embodiment, when the sandbox area 1020 is deleted, the agent 1021, the application 1023, and the data 1022 may be deleted and the sandbox use environment may be terminated.

As illustrated in FIGS. 11A-D, the electronic device may allow a plurality of external electronic devices to be connected thereto. When a connection request for a sandbox pairing is received, as described in FIG. 11A, from the first external electronic device 1002, the electronic device 1001 may generate, as described in FIG. 11B, the first sandbox area 1020 for the first external electronic device 1002. The electronic device 1001 may set environment information of the first sandbox area 1020 on the basis of environment information of the first external electronic device 1002, and install the agent 1021, which can interact with the agent 1091 of the first external electronic device 1002, in the first sandbox area 1020. Further, the electronic device 1001 may install, in the first sandbox area 1020, at least one application 1023 which the electronic device 1001 uses while interact with the first external electronic device 1002 and store data 1022 in the first sandbox area 1020. The electronic device 1001 may receive, as described in FIG. 11C, a connection request for a sandbox pairing from a second external electronic device 1003 while receiving functions through at least one application 1023 to be used while interacting with the first external electronic device 1002. When the connection request for the sandbox pairing is received from the second external electronic device 1003, the electronic device 1001 may generate, as described in FIG. 11D, the second sandbox area 1030 for the second external electronic device 1003. The electronic device 1001 may set environment information of the second sandbox area 1030 on the basis of environment information of the second external electronic device 1003, and install an agent 1031, which can interact with an agent 1092 of the second external electronic device 1003, in the second sandbox area 1030. Further, the electronic device 1001 may install, in the second sandbox area 1030, at least one application 1033 to be used while interacting with the second external electronic device 1003 and store data 1032 in the second sandbox area 1030.

As illustrated in FIGS. 12A-D, the electronic device may allow one external electronic device to be connected thereto. When a connection request for a sandbox pairing is received, as described in FIG. 12A, from the first external electronic device 1002, the electronic device 1001 may generate, as described in FIG. 12B, the first sandbox area 1020 for the first external electronic device 1002. The electronic device 1001 may set environment information of the first sandbox area 1020 on the basis of environment information of the first external electronic device 1002, and install the agent 1021, which can interact with the agent 1091 of the first external electronic device 1002, in the first sandbox area 1020. Further, the electronic device 1001 may install, in the first sandbox area 1020, at least one application 1023 to be used while interacting with the first external electronic device 1002 and store data 1022 in the first sandbox area 1020. The electronic device 1001 may receive, as described in FIG. 12C, a connection request for a sandbox pairing from a second external electronic device 1003 while receiving functions through at least one application 1023 to be used while interacting with the first external electronic device 1002. When the connection request for the sandbox pairing is received from the second external electronic device 1003, the electronic device 1001 may refuse, as described in FIG. 12D, the connection request made by the second external electronic device 1003.

As illustrated in FIGS. 13A-E, when there is a disconnection request, the electronic device may delete an application, data, and sandbox use environment, which are related to an existing external electronic device, from a sandbox area while maintaining the sandbox area and then perform a connection with another electronic device.

Figure 13A:
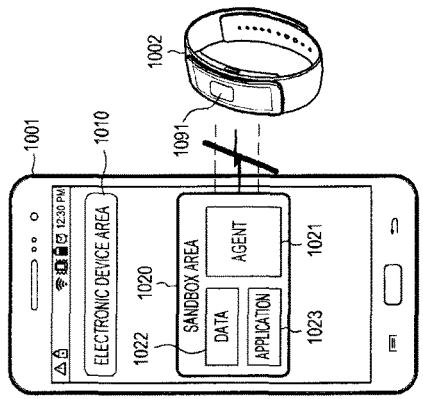
FIG. 13A is a diagram of an example of a system including an electronic device and an external electronic device, according to various embodiments of the present disclosure.
Figure 13B:
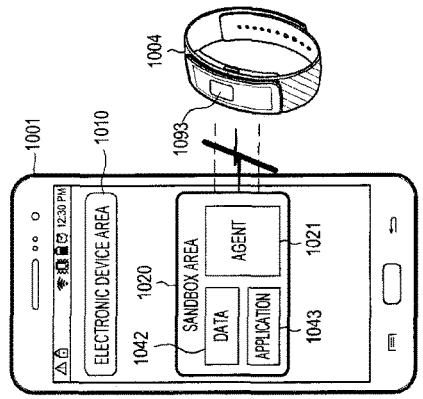
FIG. 13B is a diagram of an example of a system including an electronic device and an external electronic device, according to various embodiments of the present disclosure.
Figure 13C:
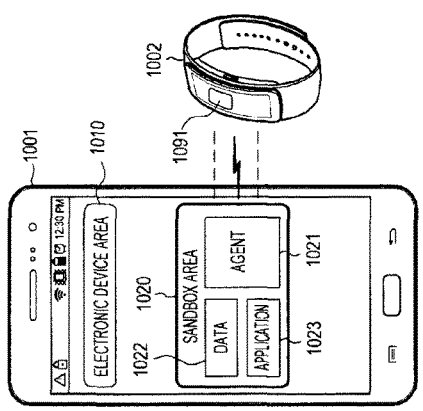
FIG. 13C is a diagram of an example of a system including an electronic device and an external electronic device, according to various embodiments of the present disclosure.
Figure 13D:
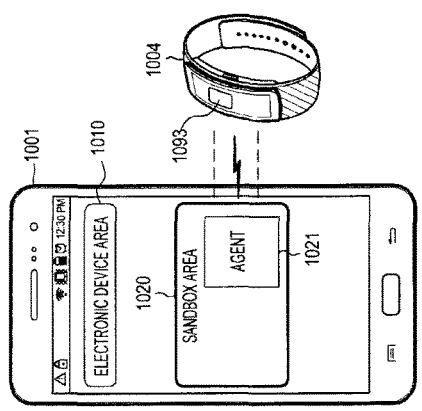
FIG. 13D is a diagram of an example of a system including an electronic device and an external electronic device, according to various embodiments of the present disclosure.
Figure 13E:
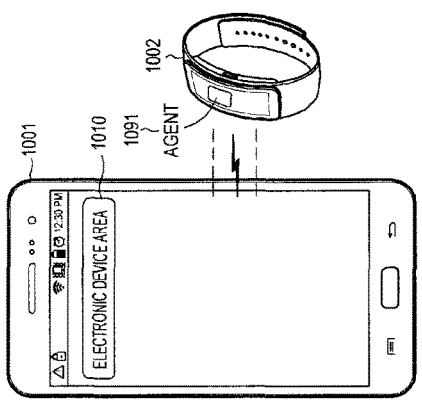
FIG. 13E is a diagram of an example of a system including an electronic device and an external electronic device, according to various embodiments of the present disclosure.
Figure 13F:
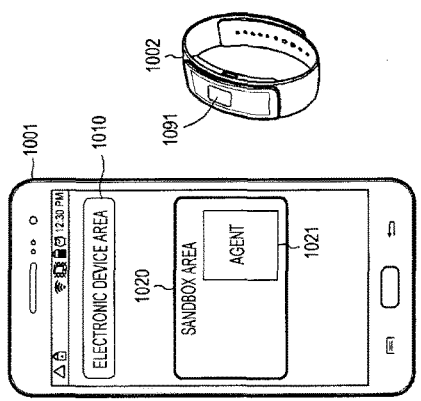
FIG. 13F is a diagram of an example of a system including an electronic device and an external electronic device, according to various embodiments of the present disclosure.

When a connection request for a sandbox pairing is received, as described in FIG. 13A, from the external electronic device 1002, the electronic device 1001 may generate, as described in FIG. 13B, the sandbox area 1020 for the external electronic device 1002. The electronic device 1001 may set environment information of the sandbox area 1020 on the basis of environment information of the external electronic device 1002, and install the agent 1021, which can interact with the agent 1091 of the external electronic device 1002, in the sandbox area 1020. Further, the electronic device 1001 may install, in the sandbox area 1020, at least one application 1023 to be used while interacting with the external electronic device 1002 and store data 1022 in the sandbox area 1020. The electronic device 1001 may receive, as described in FIG. 13C, a disconnection request corresponding to a sandbox pairing stop while functions are performed through at least one application 1023 to be used while interworking with the external electronic device 1002. When the disconnection request is received, the electronic device 1001 may maintain, as described in FIG. 13D, the sandbox area 1020 and the agent 1021 installed in the sandbox area 1020 and may delete at least one application 1023 to be used while interacting with the external electronic device 1002, and the data 1022. When the sandbox area 1020 and the agent 1021 installed in the sandbox area 1020 exist, the electronic device 1001 may receive, as described in FIG. 13E, a connection request from another external electronic device 1004. When a connection request for a sandbox pairing is received from the another external electronic device 1004, as described in FIG. 13F, the electronic device 1001 may reset environment information of the pre-generated sandbox area 1020 on the basis of environment information of the another external electronic device 1004; install at least one application 1043 to be used while interacting with the another external electronic device 1004, in the sandbox area 1020; and store data 1042 in the sandbox area 1020.

As illustrated in FIGS. 14A-F, the electronic device may include a DB, in which connection history of an external electronic device is stored, to use a sandbox according to information on a stored connection history when a connection request is made.

When a connection request for a sandbox pairing is received, as described in FIG. 14A, from the external electronic device 1002, the electronic device 1001 may generate, as described in FIG. 14B, the sandbox area 1020 for the external electronic device 1002. The electronic device 1001 may set environment information of the sandbox area 1020 on the basis of an environment of the external electronic device 1002, and install the agent 1021, which can interact with the agent 1091 of the external electronic device 1002, in the sandbox area 1020. Further, the electronic device 1001 may install, in the sandbox area 1020, at least one application 1023 to be used while interacting with the external electronic device 1002 and store data 1022 in the sandbox area 1020. Further, the electronic device 1001 may store the connection history information of the external electronic device 1002 in a DB 1080. The connection history information may include: environment information of the external electronic device 1002; information on the agent 1021 which can interact with the agent 1091 of the external electronic device 1002; and information on the data 1022 and at least one application 1023 used while interacting with the external electronic device 1002. The electronic device 1001 may receive, as described in FIG. 14C, a disconnection request corresponding to a sandbox pairing stop during while operating in connection with the external electronic device 1002. When the disconnection request is received, the electronic device 1001 may maintain, as described in FIG. 14D, the sandbox area 1020 and the agent 1021 installed in the sandbox area 1020, and delete at least one application 1023 to be used while interacting with the first external electronic device 1002, and the data 1022. When the sandbox area 1020 and the agent 1021 installed in the sandbox area 1020 exist, the electronic device 1001 may receive, as described in FIG. 14E, a reconnection request from the external electronic device 1002. When the reconnection request is received from the external electronic device 1002, the electronic device 1001, as described in FIG. 14F, the electronic device 1001 may configure the sandbox area 1020 by using the connection history information stored the DB 1080, that is, the environment information of the external electronic device 1002, the information of the agent 1021 which can interact with the agent 1091 of the external electronic device 1002, and the information on the data 1022 and at least one application 1023 used while interacting with the external electronic device 1002.

According to various embodiments, the electronic device and the external electronic device may be a first electronic device and a second electronic device, respectively. The first electronic device may be a main electronic device and the second electronic device may be an auxiliary electronic device.

Figure 15:
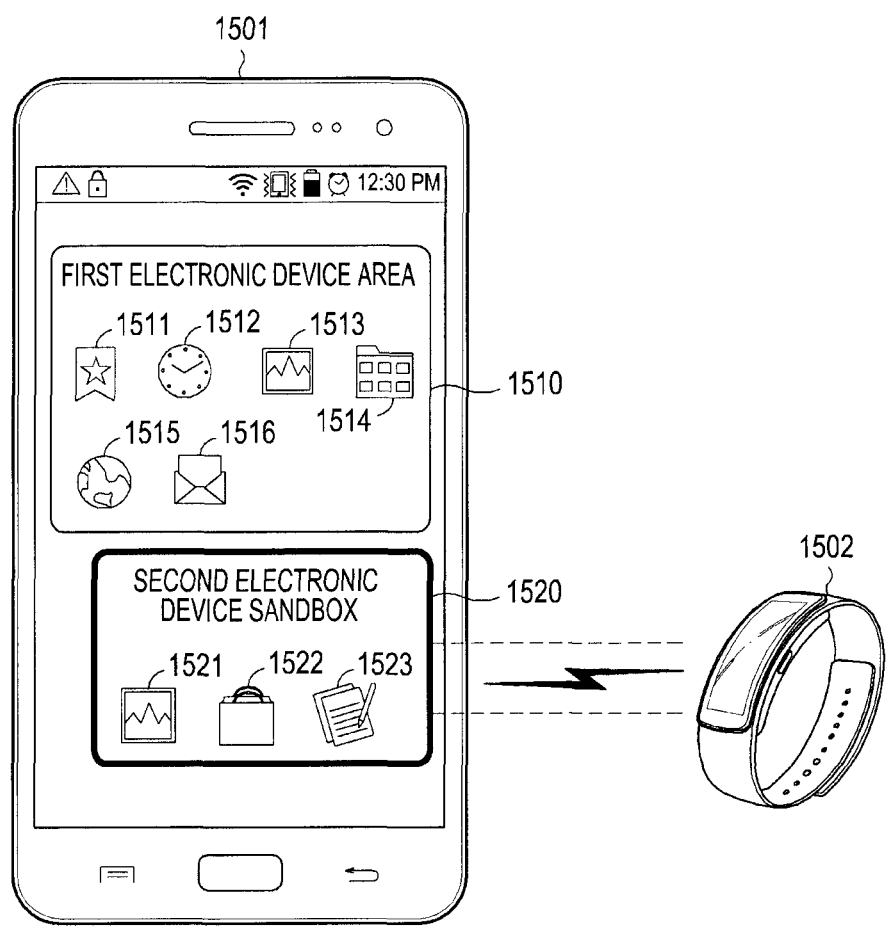
FIG. 15 is a diagram of an example of a system in which a first electronic device provides a function by installing an application, which corresponds to a function of a second electronic device, in a second electronic device sandbox according to various embodiments of the present disclosure.

FIG. 15 is a diagram of an example of a system in which a first electronic device provides a function by installing an application, which corresponds to a function of a second electronic device, in a second electronic device sandbox according to various embodiments of the present disclosure. As illustrated in FIG. 15, a first electronic device 1501 may be a mobile terminal such as a smartphone or the like and a second electronic device 1502 may be an accessory device, such as a smart watch, that is arranged to interact (e.g., operate in conjunction) with the mobile terminal. The first electronic device 1501 and the second electronic device 1502 may provide a function while being connected to each other and may provide a function without being connected to each other. According to an embodiment, when a user of the first electronic device 1501 and a user of the second electronic device 1502 are different from each other, applications corresponding to functions of the second electronic device 1502 may be installed in a second electronic device sandbox 1520 separated from a first electronic device area so as to provide the functions of the second electronic device 1502. Applications installed in the first electronic device area 1510 may be applications 1511-1516 for providing functions of the first electronic device 1501 and applications installed in the second electronic device sandbox 1520 may be applications 1521-1523 for providing functions of the second electronic device 1502.

Figure 16:
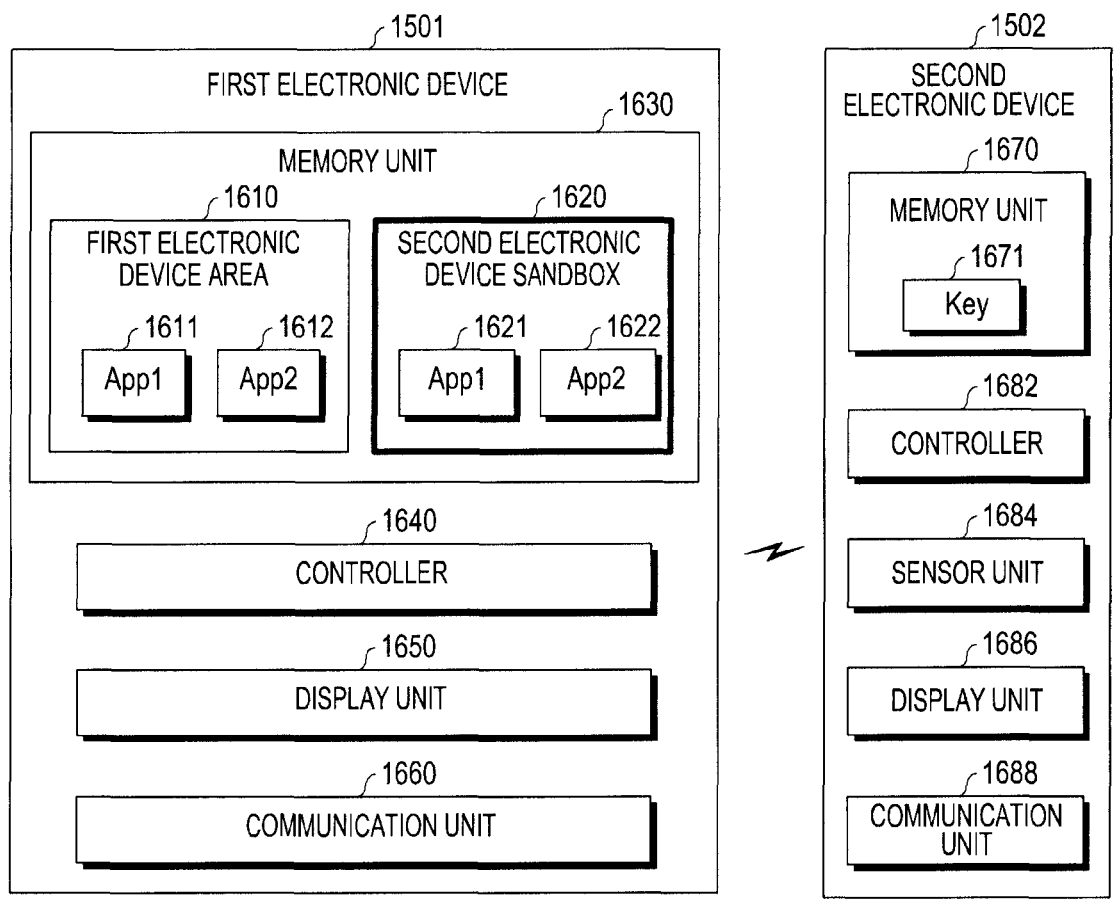
FIG. 16 is a block diagram of an example of a first electronic device and a second electronic device, according to various embodiments of the present disclosure.

FIG. 16 is a block diagram of an example of a first electronic device and a second electronic device, according to various embodiments of the present disclosure. As illustrated in FIG. 16, the second electronic device 1502 may include a memory unit 1670, a control unit 1682, a sensor unit 1684, a display unit 1686, and a communication unit 1688.

The memory unit 1670 may store various data and programs required for operations of the second electronic device 1502 and may store key information and second electronic device environment information for pairing a sandbox with the first electronic device 1501. The key information may include an encryption key for conducting secure communications with the first electronic device 1501. The second electronic device environment information may include a list of applications to be used while interacting with the second electronic device, an indication of a sandbox security level, or environment setting information (e.g. information on camera permission).

The sensor unit 1684 may transmit, to the control unit 1682, various pieces of sensing information generated in the second electronic device 1502.

The control unit 1682 may control respective all elements of the second electronic device 1502. The control unit 1682 may send a request for a sandbox pairing to the first electronic device 1501 through the communication unit 1688 and may receive a sandbox pairing acceptance message from the first electronic device 1501. The control unit 1682 may transmit the key information and the second electronic device environment information to the first electronic device 1501. When a second electronic device sandbox 1620 has been generated in the first electronic device 1501, the control unit 1682 may perform a function request through the second electronic device sandbox 1620. When requesting functions, the control unit 1682 may transmit a list of functions, which are desired to be received through the second electronic device sandbox 1620, to the first electronic device 1501 through the communication unit 1688. When the setup of the second electronic device sandbox 1620 is completed, the control unit 1682 may receive data through the communication unit 1688.

The display unit 1686 may display the received data.

According to aspects of the disclosure, the first electronic device 1501 may include a memory unit 1630, a control unit 1640, a display unit 1650, and a communication unit 1660.

The memory unit 1630 may include a first electronic device area 1610 in which data and applications of the first electronic device 1501 are stored. The second electronic device sandbox 1620, which is separated from the first electronic device area 1610, may be generated in the memory unit 1630 according to a control of the control unit 1640, wherein applications of the second electronic device 1502, which do not share data with applications of the first electronic device area 1610, are allocated or executed in the second electronic device sandbox 1620.

The control unit 1640 may control all elements of the first electronic device 1501. The control unit 1640 may receive a sandbox pairing request from the second electronic device 1502 through the communication unit 1660 and may transmit a sandbox pairing acceptance message to the second electronic device 1502. The control unit 1640 may receive key information and second electronic device environment information from the second electronic device 1502 through the communication unit 1660, generate the second electronic device sandbox 1620 in the memory unit 1630, and notify the second electronic device 1502 of the generation. The control unit 1640 may transmit data, which is generated in the second electronic device sandbox 1620, to the second electronic device 1502 through communication unit 1660.

The display unit 1650 may display the first electronic device area 1610 and the second electronic device sandbox 1620, and may display applications included in at least one of the first electronic device area 1610 and the second electronic device sandbox 1620.

Figure 17:
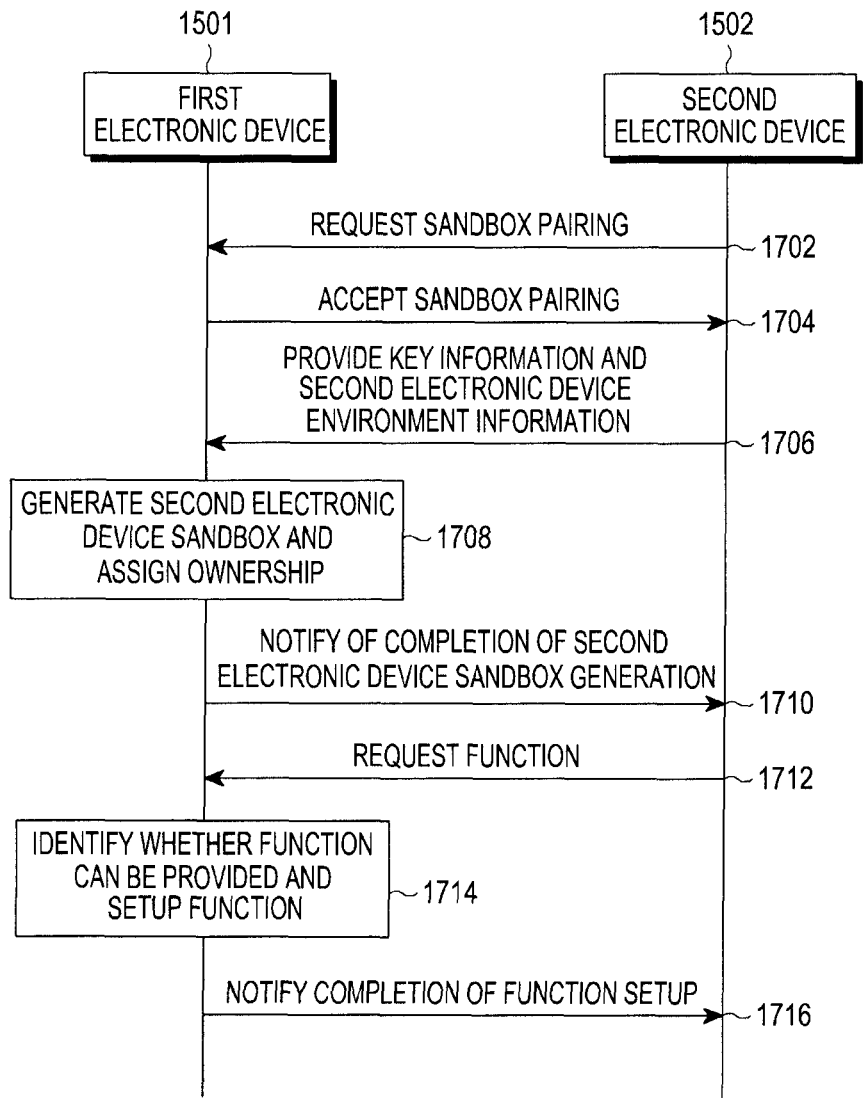
FIG. 17 is a sequence diagram of an example of a process, according to various embodiments of the present disclosure.

FIG. 17 is a sequence diagram of an example of a process, according to various embodiments of the present disclosure. According to the process, the second electronic device 1502 may send a request for a sandbox pairing to the first electronic device 1501 in operation 1702. According to various embodiments, the second electronic device 1502 may request the sandbox pairing by using various communication schemes. The communication schemes may include a short range communication, such as Bluetooth, Wi-Fi, WiGig, etc. In addition, other various communication schemes are available. The sandbox pairing request may be to send a request for the second electronic device sandbox 1620, which is separated from the first electronic device area 1610, for functions of the second electronic device 1502 to an application area of the first electronic device 1501.

The first electronic device 1501 may transmit, in operation 1704, a sandbox pairing acceptance message to the second electronic device 1502. According to various embodiments, the first electronic device 1501 may determine whether a sandbox pairing is possible in response to a sandbox pairing request and transmit a sandbox pairing acceptance message when the sandbox pairing is possible. According to various embodiments, the first electronic device 1501 may determine whether the sandbox pairing is possible according to various conditions, such as whether the second electronic device 1502 can be connected, whether the first electronic device 1501 supports a second electronic device 1502 sandbox, and the like. For example, where only one second electronic device 1502 is permitted to be connected to the first electronic device 1501, if another second electronic device 1502 is already connected to the electronic device, the first electronic device 1501 may determine a sandbox pairing to be impossible. Further, if the state of stored data does not support the second electronic device sandbox 1620, the first electronic device 1501 may determine the sandbox pairing to be impossible. When a sandbox pairing is impossible, the first electronic device 1501 may transmit, to the second electronic device 1502, a message indicating that the sandbox pairing is impossible.

When the sandbox pairing acceptance message is received, the second electronic device 1502 may provide, in operation 1706, key information (e.g., an encryption key) and second electronic device environment information. According to an embodiment, the key information may include key information (e.g., an encryption key) for conducting secure communications with the first electronic device 1501. The second electronic device environment information may include a list of applications to be used while interacting with the second electronic device, an indication of a sandbox security level, or environment setting information (e.g. information on camera permission).

The first electronic device 1501 may generate, in operation 1708, the second electronic device sandbox 1620 and assign ownership thereto. According to an embodiment, the first electronic device 1501 may generate the second electronic device sandbox 1620 in an application area by using the key information and second electronic device environment information received from the second electronic device 1502, and may assign ownership designating or assigning that a user of the second electronic device 1502 has an authority to use the second electronic device sandbox 1620. In operation 1710, the first electronic device 1501 may notify to the second electronic device 1502 that the second electronic device sandbox has been generated.

In operation 1712, the second electronic device 1502 may request a function from the first electronic device 1501. When requesting functions, the second electronic device 1502 may transmit, to the first electronic device 1501, a list of functions desired to be received through the second electronic device sandbox 1620. According to various embodiments, the list of functions may include a list of applications which the second electronic device 1502 desires to receive through the second electronic device sandbox 1620. For example, the second electronic device 1502 may transmit, to the first electronic device 1501, a function list including information such as a name, ID, etc. of at least one application desired to be received through the second electronic device sandbox 1620.

When the function list is received, in operation 1714, the first electronic device 1501 may determine whether functions can be provided and may set up the functions. According to an embodiment, the first electronic device 1501 may check functions (e.g. applications) included in the function list and identify functions which can be supported by the present electronic device and functions which cannot be supported by the present electronic device. According to various embodiments, the first electronic device 1501 may install an application corresponding to a supported function in the second electronic device sandbox 1620 so as to set up the function or may install a separate profile agent in the second electronic device sandbox 1620 so as to set up a function to receive a supported function from an external profile server through the profile agent.

According to an embodiment, when installing an application corresponding to a supported function in the second electronic device sandbox 1620, the first electronic device 1501 may additionally install a preinstalled application in the second electronic device sandbox 1620, or may download a new application from an external application server and install the new application in the second electronic device sandbox 1620. Further, the first electronic device 1501 may set the second electronic device sandbox 1620 to manage user data for the second electronic device 1502, separately from user data of an application installed in the first electronic device area 1610.

When an application corresponding to a supported function has been installed or when the first electronic device 1501 can receive a supported function from the external profile server through the profile agent, the first electronic device 1501 may notify the second electronic device 1502 of function setup completion. According to an embodiment, when notifying of the function setup completion, the electronic device may transmit a list of installed functions and a list of unsupported functions to an external electronic device.

When the second electronic device sandbox 1620 has been set up, the first electronic device 1501 may transmit data to the second electronic device 1502. According to an embodiment, one or more of applications installed in the second electronic device sandbox 1620 may communicate with the corresponding application server by using a communication unit of the first electronic device 1501 and may exchange data with the corresponding application server. When data is generated in any of applications installed in the second electronic device sandbox 1620, the first electronic device 1501 may transmit the data to the second electronic device 1502. As described above, if the second electronic device sandbox 1620 is used, the second electronic device 1502 may perform pairing through another user's first electronic device 1501 other than the same user's electronic device which is permitted to be paired with the second electronic device 1502 and may received a function through the second electronic device sandbox 1620 of the another user's first electronic device 1501 which is paired with the second electronic device 1502.

The first electronic device 1501 may determine whether a sandbox pairing stop event occurs while performing functions. According to various embodiments, the sandbox pairing stop event may occur when a first electronic device 1501 user requests a sandbox pairing stop, when a second electronic device 1502 user requests a sandbox pairing stop, or when the first electronic device 1501 and the second electronic device 1502 are disconnected from each other. In addition, the sandbox pairing stop event may occur according to various other conditions.

When a sandbox pairing stop event occurs, the first electronic device 1501 may delete the second electronic device sandbox 1620. According to an embodiment, when a sandbox pairing stop request event by a user occurs, the first electronic device 1501 may notify to the second electronic device 1502 that the sandbox pairing is stopped, and delete the second electronic device sandbox 1620. According to an embodiment, when a sandbox pairing stop request event by the second electronic device 1502 occurs, the first electronic device 1501 may delete the second electronic device sandbox 1620 in response to the request. According to an embodiment, when the first electronic device 1501 is disconnected from the second electronic device 1502 and then not reconnected with the second electronic device 1502 for a predetermined time, the first electronic device 1501 may delete the second electronic device sandbox 1620. According to an embodiment, when disconnected from the second electronic device, the first electronic device 1501 may notify both the first electronic device 1501 user and the second electronic device 1502 user of the disconnection, and delete the second electronic device sandbox 1620 according to any one user's selection. When the second electronic device sandbox 1620 is deleted, an application installed in the second electronic device sandbox 1620 may be deleted and an application use environment may be terminated.

FIGS. 18-21B illustrate examples of interactions between a first electronic device and a second electronic device, according to various embodiments of the present disclosure.

Figure 18:
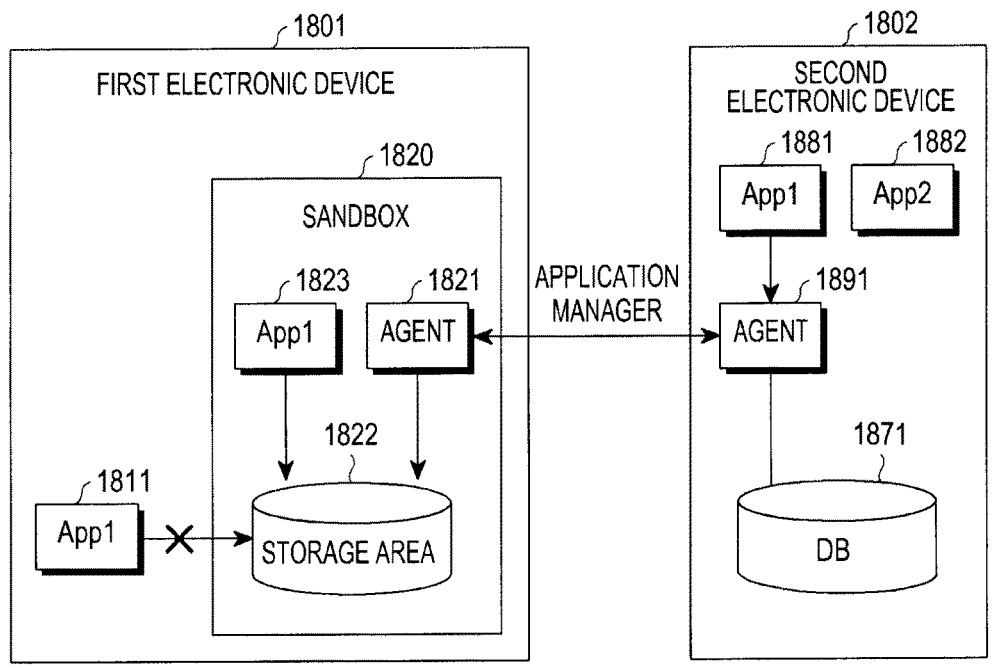
FIG. 18 is a diagram illustrating the operation of a system including a first electronic device and a second electronic device, according to various embodiments of the present disclosure.

Referring to FIG. 18, according to an embodiment, agents 1821 and 1891, used for the link function, may be installed in a first electronic device 1801 and a second electronic device 1802, respectively. The agent 1891 of the second electronic device 1802 may transmit an application list that is stored in a DB 1871, on applications 1881 and 1882 installed in the second electronic device 1802. According to an embodiment, the DB 1871 may be configured as a module in the agent 1891 of the second electronic device 1802. The agent 1821 of the first electronic device 1801 may receive the application list, store the received application list in a storage area 1822, and then install a required application, for example, an App1 1823 in a sandbox 1820. According to an embodiment, the DB 1871 may be configured as a module in the agent 1891 of the second electronic device 1802. According to an embodiment, when an App1 1811, which is an application having the same package identifier as application installed in an area within the sandbox 1820, is installed in an area other than the sandbox 1820, the App1 1811 may not share data and/or code with an application within the sandbox 1820 and may not access the storage area 1822.

Figure 19:
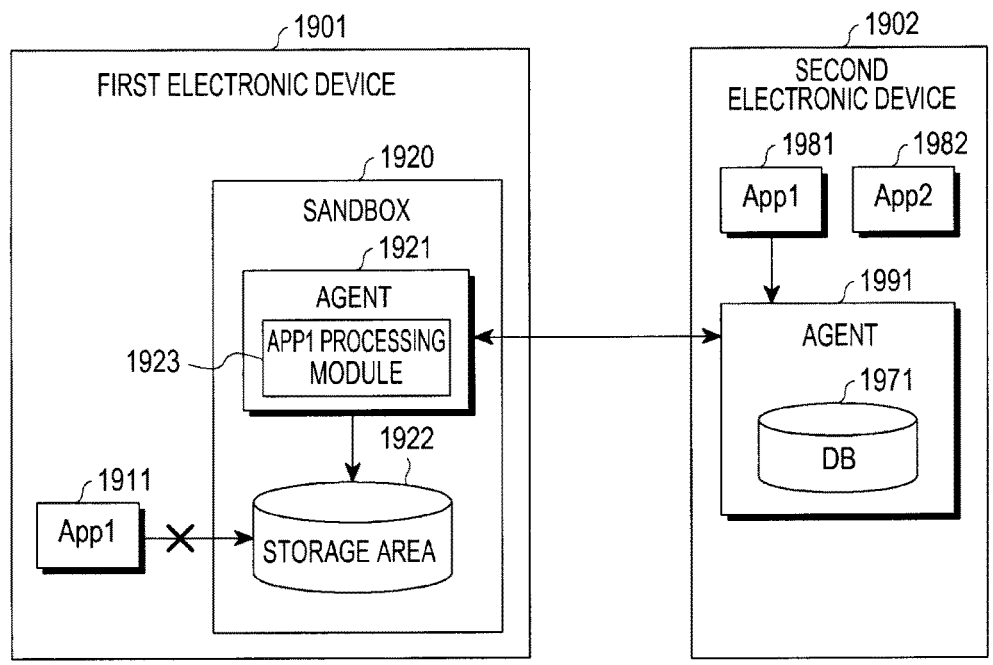
FIG. 19 is a diagram illustrating the operation of a system including a first electronic device and a second electronic device, according to various embodiments of the present disclosure.

Referring to FIG. 19, according to an embodiment, agents 1921 and 1991 may be installed in a first electronic device 1901 and a second electronic device 1902, respectively. The agent 1991 of the second electronic device 1902 may include a DB 1971 which includes information associated with applications 1981 and 1982 that are installed in the second electronic device 1902. The agent 1991 of the second electronic device 1902 may transmit the application list to the agent 1921 of the first electronic device 1901 that is stored in the DB 1971. The agent 1921 of the first electronic device 1901 may include a module that controls at least one of applications 1981 and 1982, which are installed in the second electronic device 1902, to be executed. According to an embodiment, the agent 1921 may include an App1 processing module 1923 that controls an App1 1981, among the applications 1981 and 1982 installed in the second electronic device 1902, to be executed. For example, when the App1 1981 is an e-mail application, the App1 processing module 1923 may include a processing code related to the e-mail application, and the App1 1981 may perform an e-mail function while exchanging a necessary message with the agent 1921 of the first electronic device 1901 through the agent 1991 of the second electronic device 1902. According to an embodiment, when an App1 1911 (e.g. e-mail application), which is an application having the same package identifier as an application in installed in an area within the sandbox 1920, is installed in an area other than the sandbox 1920, the App1 1911 may not share data and/or code with an application within the sandbox 1920 and may not access a storage area 1922.

Figure 20:
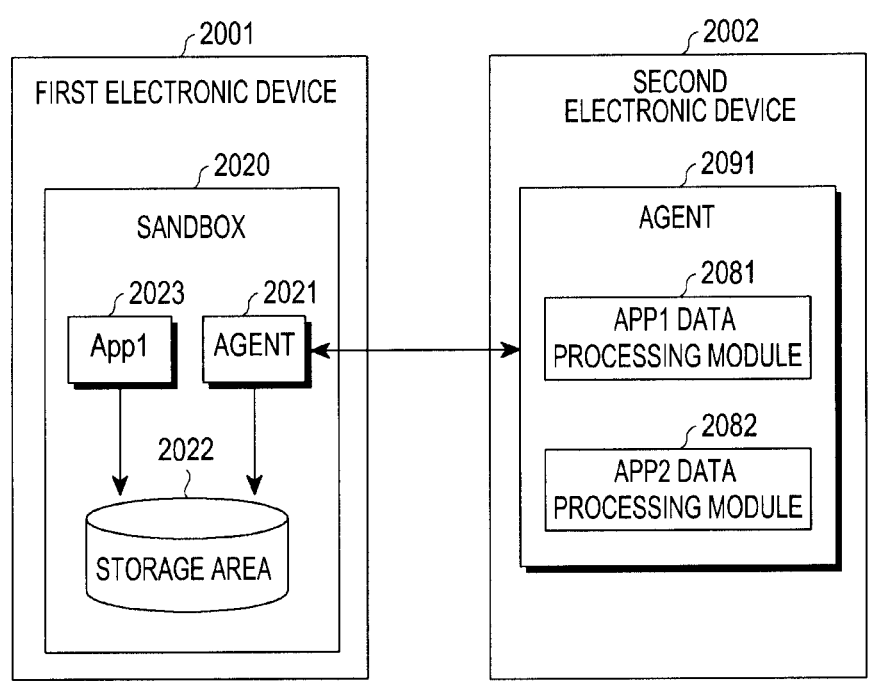
FIG. 20 is a diagram illustrating the operation of a system including a first electronic device and a second electronic device, according to various embodiments of the present disclosure.

Referring to FIG. 20, according to an embodiment, agents 2021 and 2091 may be installed in a first electronic device 2001 and a second electronic device 2002, respectively. The agent 2091 of the second electronic device 2002 may include one or more application processing modules 2081 and 2082 which can be used in the second electronic device 2002. The agent 2021 of the first electronic device 2001 may permit an App1 data processing module 2081 and an App2 data processing module 2082 to interact with an App1 2023. For example, when the App1 2023 (e.g. e-mail application) is executed, the agent 2021 of the first electronic device 2001 may transmit data of an App 2023 to the App1 data processing module 2081 through the agent 2091 of the second electronic device 2002, and the App1 data processing module 2081 may process the data of the App 2023 so as to be used in the second electronic device 2002.

Figure 21A:
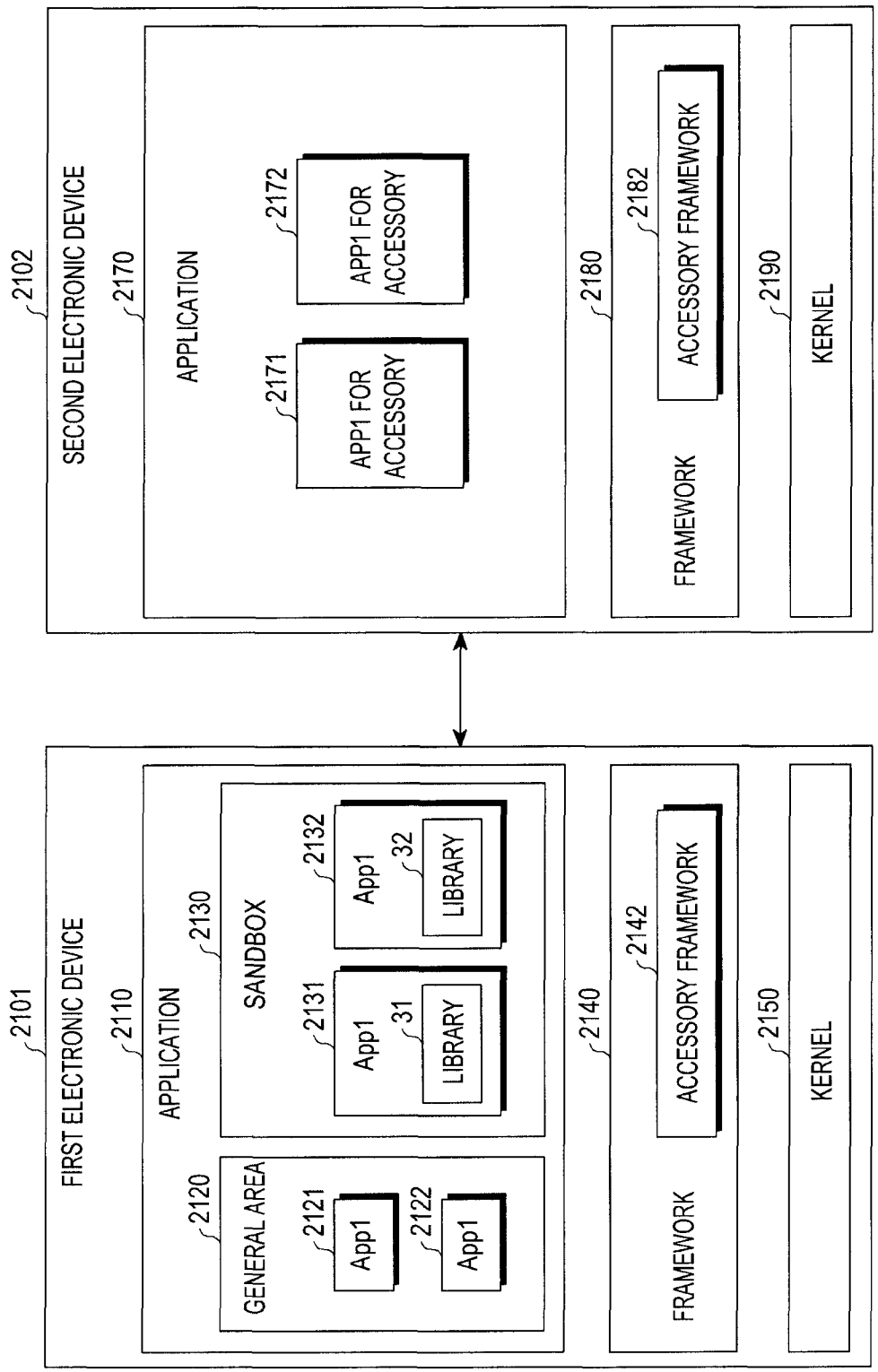
FIG. 21A is a diagram illustrating the operation of a system including a first electronic device and a second electronic device, according to various embodiments of the present disclosure.

As illustrated in FIG. 21A, a first electronic device 2101 may include an application layer 2110, a framework layer 2140, and a kernel layer 2150; and a second electronic device 2102 may also include an application layer 2170, a framework layer 2180, and a kernel layer 2190. Each of the application layers 2110 and 2170 may be a layer in which an application is installed and executed and may be set as an area in which data required to execute the application can be stored and processed. The framework layers 2140 and 2180 may serve as an intermediary that enables an application to communicate with the kernel so as to exchange data with the kernel. Each of the kernel layers 2150 and 2190 may control and manage system resources which are used to execute an operation or function implemented in an application, and may provide an interface for such a control or management.

General applications, for example, an App 2121 and an App2 2122 may be installed in a general area 2120 within the application layer 2110 of first electronic device 2101. Applications, which are executed while interworking with the second electronic device 2102, for example, an App1 2131 and an App2 2132 may be installed in a sandbox 2130.

The applications installed in the sandbox 2130, for example, the App1 2131 and the App2 2132 may include a library 31 and a library 32, respectively. Each of the libraries 31 and 32 may include a library code used to communicate with the second electronic device 2102. The library code interacts with an accessory framework 2182, which is included in the framework 2180 of the second electronic device 2102, through an accessory framework 2142 included in the framework 2140, so as to enable data related to a given one of the App1 2131 and App2 2132 of the first electronic device 2101 to be transmitted to the second electronic device 2102 and, in reverse, so as to enable data related to each of an App1 2171 for an accessory and an App2 2172 for an accessory to be transmitted to the first electronic device 2101. Any of the App1 2131 and the App2 2132 of the first electronic device 2101 and/or any of the App1 2171 for an accessory and the App2 2172 for an accessory in the application layer 2170 of second electronic device 2102 may serve as a provider providing data and/or functions or a consumer receiving the data and/or functions provided from the provider.

Figure 21B:
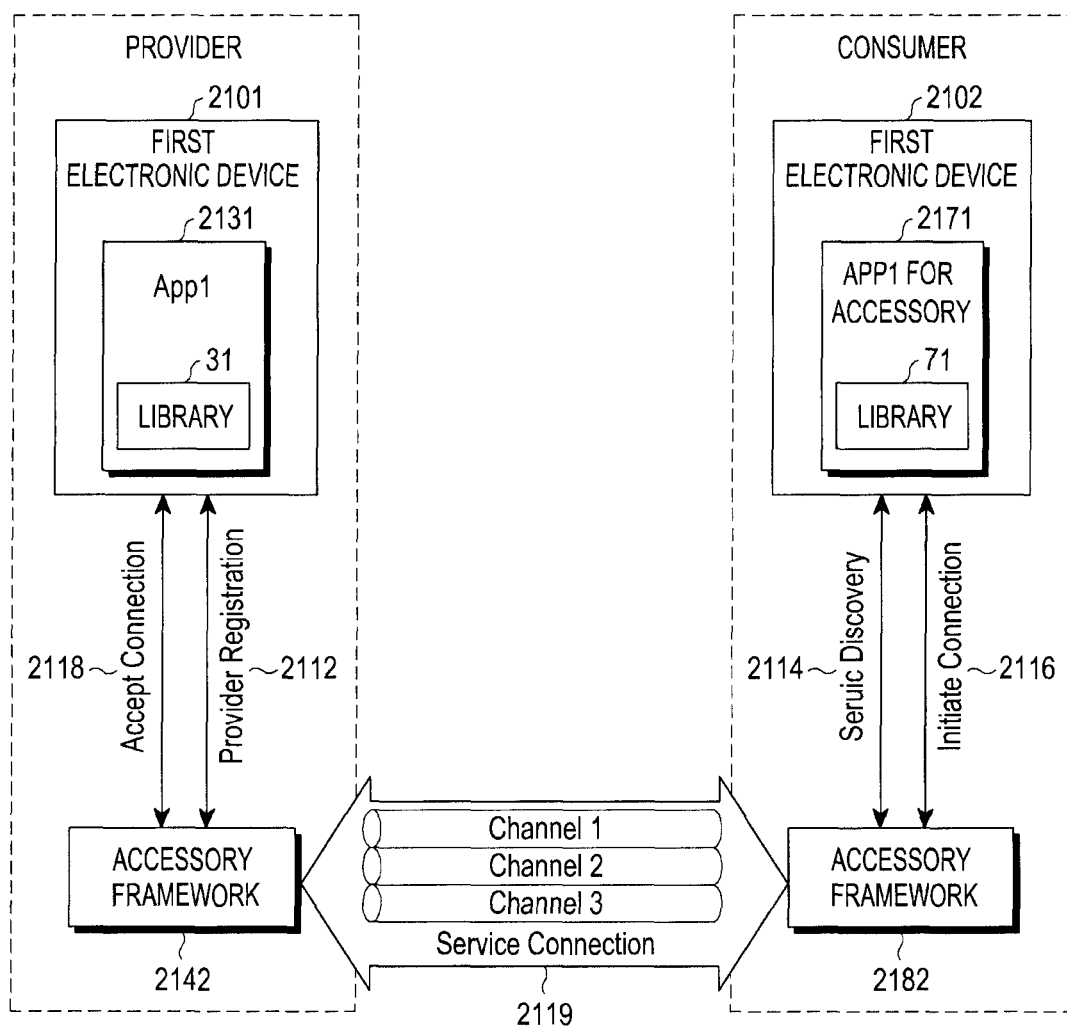
FIG. 21B is a diagram illustrating the operation of a system including a first electronic device and a second electronic device, according to various embodiments of the present disclosure.

FIG. 21B illustrates an example in which a connection is established between application applications of the first electronic device 2101 and the second electronic device 2102 when the first electronic device 2101 serves as a provider and the second electronic device 2102 serves as a consumer. In operation 2112, the App1 2131 of the first electronic device 2101, which provides data and functions, may perform a Provider Registration by using a library 31. The App1 2131 registers information associated with data or functions, which it can provide, in an accessory framework 2142 through the Provider Registration. In operation 2114, the App1 2171 for an accessory of the second electronic device 2102 may perform a Service Discovery which requests desired data or functions from an accessory framework 2182. Further, in operation 2116, the App1 2171 for an accessory of the second electronic device 2102 may perform an Initiate Connection which requests the accessory framework 2182 to be connected to the App1 2131 of the first electronic device 2101 on the basis of the desired data or functions. The App1 2131 of the first electronic device 2101 may perform an Accept Connection which accepts the connection request made from the App1 2171 for an accessory of the second electronic device 2102. In operation 2119, the App1 2131 of the first electronic device 2101 and the App1 2171 for an accessory of the second electronic device 2102 may perform a Service Connection which establishes a connection with each other. Through the establishment of such a connection, the App1 2131 of the first electronic device 2101 and the App1 2171 for an accessory of the second electronic device 2102 may interwork with each other to perform a function.

Figure 22:
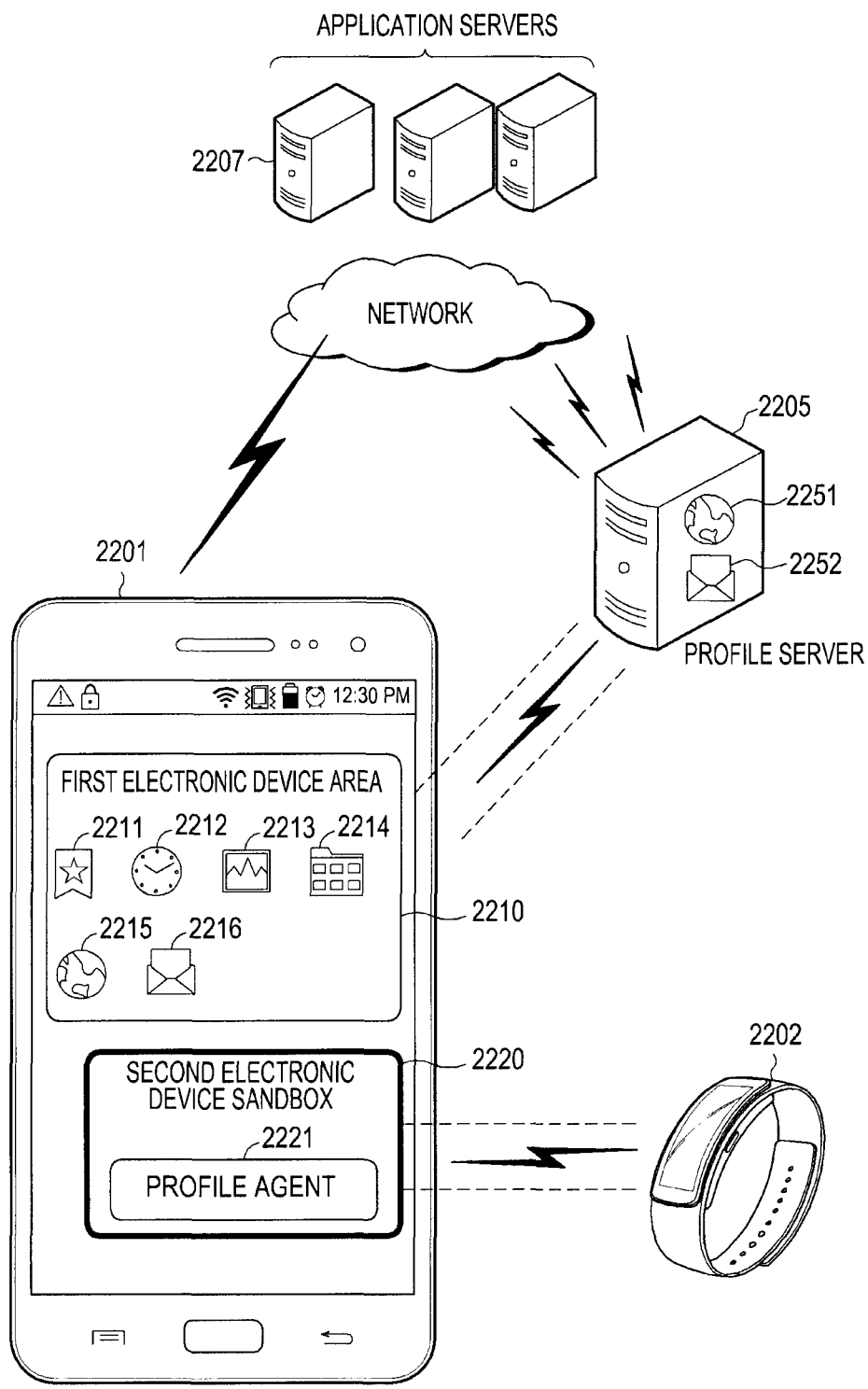
FIG. 22 is a diagram illustrating the operation of a system including a first electronic device and a second electronic device, according to various embodiments of the present disclosure.

FIG. 22 is a diagram illustrating the operation of a system including a first electronic device and a second electronic device, according to various embodiments of the present disclosure. As illustrated in FIG. 22, a first electronic device 2201 may be a mobile terminal such as a smartphone or the like and a second electronic device 2202 may be an accessory device, such as a smart watch or the like, interworking with the mobile terminal. The first electronic device 2201 and the second electronic device 2202 may provide a function while being connected to each other and may provide a function without being connected to each other. According to an embodiment, when a user of the first electronic device 2201 and a user of the second electronic device 2202 are different from each other, a profile agent 2221 may be installed in a second electronic device sandbox 2220 separated from a first electronic device area 2210, and receive data to be provided to the second electronic device from an external profile server through the profile agent 2221 so as to provide a function. Applications installed in the first electronic device area 2210 may be applications 2211-2216 for providing functions of the first electronic device 2201. The profile agent 2221 installed in the second electronic device sandbox 2220 may be an application for receiving data according to the execution of applications 2251-2252 installed in a profile server 2205 and providing the received data to the second electronic device 2202.

According to various embodiments, an electronic device includes: a communication module; a processor that is electrically connected to the communication module which corresponds to each of a plurality of external electronic devices for the electronic device; a memory that is electrically connected to the processor and stores at least one application corresponding to a function of each of one or more electronic devices; and a profile DB that is electrically connected to the processor and in which profile information corresponding to each of one or more electronic devices is stored, wherein the processor may identify an application which provides data to the second electronic device by using profile information included in the profile DB in response to a request which the first electronic device sends a function request to the second electronic device and may perform a control operation for receiving data on the second electronic device from an application server corresponding to the identified application and transmitting the received data to the first electronic device.

Figure 23:
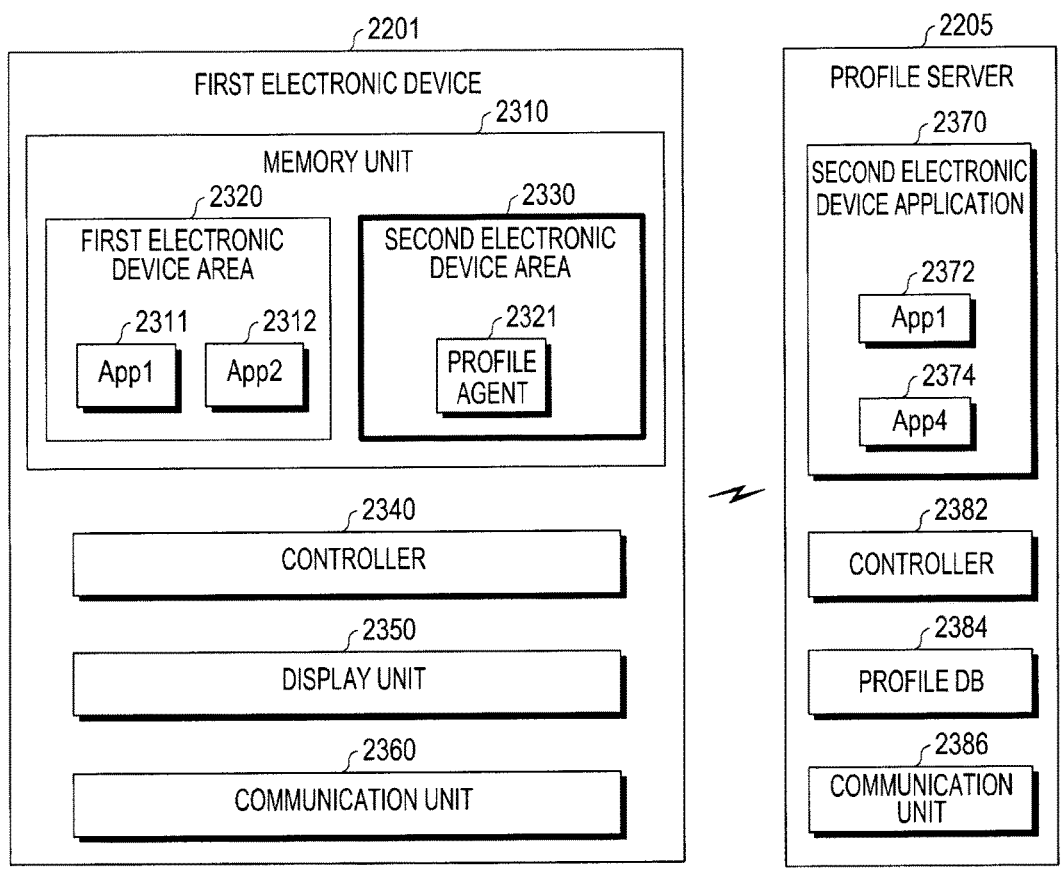
FIG. 23 is a block diagram of an example of a first electronic device and a profile server, according to various embodiments of the present disclosure.

FIG. 23 is a block diagram of an example of a first electronic device and a profile server, according to various embodiments of the present disclosure. As illustrated in FIG. 23, the first electronic device 2201 may include a memory unit 2310, a control unit 2340, a display unit 2350, and a communication unit 2360.

The memory unit 2310 may include a first electronic device area 2320 in which data and applications of the first electronic device 2201 are stored. The second electronic device sandbox 2310, which is separated from the first electronic device area 2320, may be generated in the memory unit 2340 according to a control of the control unit 2340, wherein an application of the second electronic device 2202, which do not share data with applications of the first electronic device area 2320, and a profile agent 2321 are allocated or executed in the second electronic device sandbox 2330.

The control unit 2340 may control all elements of the first electronic device 2201. The control unit 2340 may receive a sandbox pairing request from the second electronic device 2202 through the communication unit 2360 and may transmit a sandbox pairing acceptance message to the second electronic device 2202. The control unit 2340 may receive key information (e.g., an encryption key) and second electronic device environment information from the second electronic device 2202 through the communication unit 2360, generate a second electronic device sandbox 2330 in the memory unit 2310, and install a profile agent 2321 in the second electronic device sandbox 2330. The control unit 2340 may control the profile agent 2321 to provide a secure communication channel, such as a Virtual Private Network (VPN), with the profile server 2205, and may perform a control operation for receiving data of the second electronic device 2202 from the profile server 2205 and providing the data to the second electronic device 2202.

The display unit 2350 may display the first electronic device area 2320 and the second electronic device sandbox 2330, display applications included in the first electronic device area 2320, and display the profile agent 2321 included in the second electronic device sandbox 2330. According to various embodiments, a separate authentication confirmation procedure may be performed in order to display the profile agent 2321 and such a method as password input confirmation through the second electronic device 2202 may be available for authentication confirmation.

The communication unit 2360 may provide a secure communication channel, such as a Virtual Private Network (VAN), with the second electronic device 2202 and the profile server 2205.

According to aspects of the disclosure, the profile server 2205 may include a memory unit 2370, a control unit 2382, a profile DB 2384, and a communication unit 2386.

The memory unit 2370 may store applications 2372 and 2374, which correspond to functions of the second electronic device 2202, of the second electronic device 2202.

In response to a function request made by the first electronic device 2201, the control unit 2382 may identify a profile corresponding to a device ID of the second electronic device 2202 or a user ID associated with the second electronic device 2202, which is received when requesting the function, by using profile information stored in the profile DB 2384 in response. The control unit 2382 may identify a pre-stored user function list in response to the identified profile. The function list may include an application list desired to be received from the second electronic device 2202. The control unit 2382 may request an application server 2207 to authenticate a second electronic device 2202 account or a second electronic device 2202 user account. When the application server 2207 has authenticated a second electronic device 2202 account or a second electronic device 2202 user account, the control unit 2382 may receive the corresponding data through communication unit 2386. The control unit 2382 may transmit the corresponding data to the first electronic device 2201 through the communication unit 2386.

The communication unit 2386 may provide a secure communication channel, such as Virtual Private Network (VAN), with the first electronic device 2201.

According to various embodiments, a method for providing a function in an electronic device may include: in response to a function request which an electronic device sends to a second electronic device, identifying an application, which will provide data to the second electronic device, by using profile information included in the profile DB; receiving data on the second electronic device from an application server corresponding to the identified application; and transmitting the received data to the first electronic device.

Figure 24:
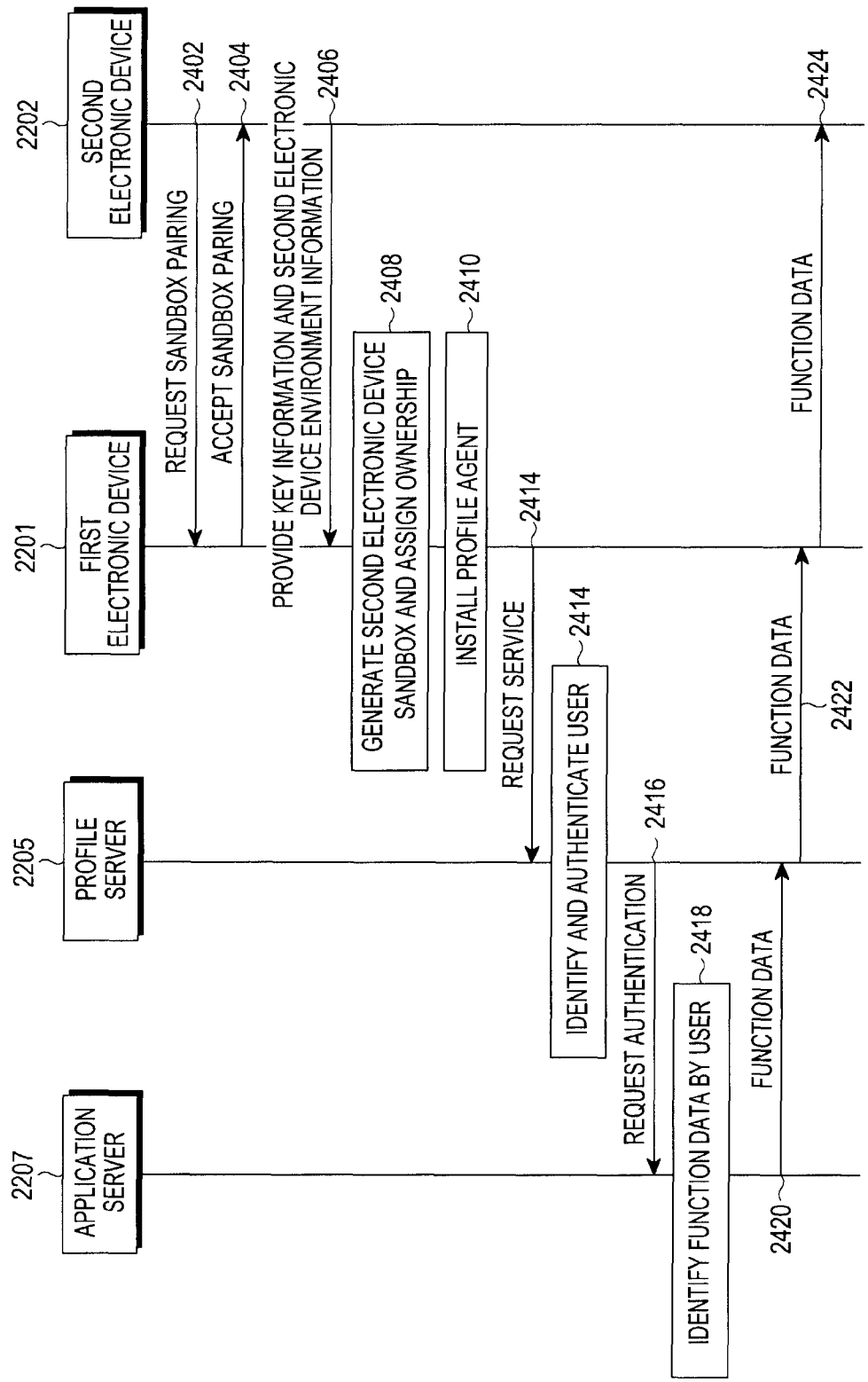
FIG. 24 is a sequence diagram of an example of a process, according to various embodiments the present disclosure.

FIG. 24 is a sequence diagram of an example of a process, according to various embodiments the present disclosure. According to the process, the second electronic device 2202 may send a request for a sandbox pairing to the first electronic device 2201 in operation 2402. According to various embodiments, the second electronic device 2202 may request the sandbox pairing by using various communication schemes. The communication schemes may include a short range communication, such as Bluetooth, Wi-Fi, WiGig, etc. In addition, other various communication schemes are available. The sandbox pairing request may be to send a request for the second electronic device sandbox 2210, which is separated from the first electronic device area 2220, for functions of the separate second electronic device 2202 to an application area of the first electronic device 2201.

The first electronic device 2201 may transmit, in operation 2404, a sandbox pairing acceptance message to the second electronic device 2202. According to various embodiments, the first electronic device 2201 may determine whether a sandbox pairing is possible in response to a sandbox pairing request and transmit a sandbox pairing acceptance message when the sandbox pairing is possible. According to various embodiments, the first electronic device 2201 may determine whether the sandbox pairing is possible according to various conditions, such as whether the second electronic device 2202 can be connected, whether the first electronic device 2201 supports a second electronic device 2202 sandbox, and the like. For example, in the case where only one second electronic device 2202 is permitted to be connected to the first electronic device 2201, if another second electronic device 2202 is already connected to the electronic device, the first electronic device 1501 may determine a sandbox pairing to be impossible. Further, if the state of stored data does not support the second electronic device sandbox 2220, the first electronic device 2201 may determine the sandbox pairing to be impossible. When the sandbox pairing is impossible, the first electronic device 2201 may transmit, to the second electronic device 2202, a message indicating that the sandbox pairing is impossible.

When the sandbox pairing acceptance message is received, the second electronic device 2202 may provide, in operation 2406, key information and second electronic device environment information. According to an embodiment, the key information may include an encryption key for conducting secure communications with the first electronic device 2201. The second electronic device environment information may include: information relating to an application, which is executed in the second electronic device 2202, such as a second electronic device ID, a second electronic device user ID, an application list, an indication of a security level, an indication of a camera usage permission; and application execution environment information in the second electronic device 2202.

The first electronic device 2201 may generate, in operation 2408, the second electronic device sandbox 2220 and assign ownership thereto. According to an embodiment, the first electronic device 2201 may generate the second electronic device sandbox 2220 in an application area by using the key information and second electronic device environment information received from the second electronic device 2202, and may assign ownership designating or assigning that a user of the second electronic device 2202 has authority to use the second electronic device sandbox 2220.

The first electronic device 2201 may install, in operation 2410, a profile agent 2221 in the second electronic device sandbox 2220. The first electronic device 2201 may select a profile agent according to the type of the second electronic device 2202 from among a plurality of profile agents and install the selected profile agent. The profile agent 2221 may be a program such as an application, may provide a secure communication channel, such as a Virtual Private Network (VPN), with the profile server 2205 according to a control of the control unit 2340, and may perform an operation for receiving data of the second electronic device 2202 from the profile server 2205 and providing the data to the second electronic device 2202. According to an embodiment, when the data of the second electronic device 2202 is received from the profile server 2205, the profile agent 2221 may convert a file format of the received data into a file format used by the second electronic device 2202, or perform data processing so that the received date can be used in the second electronic device 2202.

When the profile agent 2221 is installed, the first electronic device 2201 may send, in operation 2412, a request for a function to the profile server 2205 through the profile agent 2221. According to various embodiments, when sending the function request, the first electronic device 2201 may transmit, to the profile server 2205, a device ID of the second electronic device 2202 and a user ID of the second electronic device 2202. According to an embodiment, if necessary, the first electronic device 2201 may further transmit the device ID of the first electronic device 2201 or the user ID of the first electronic device 2201.

The profile server 2205 may identify and authenticate a user according to the function request in operation 2414. According to various embodiments, the profile server 2205 may identify the corresponding profile by using the device ID of the second electronic device 2202 or the user ID of the second electronic device 2202 which is received when the function request is made. The profile server 2205 may identify a pre-stored user function list in response to the identified profile. The function list may include an application list desired to be received from the second electronic device 2202.

In operation 2416, the profile server 2205 may request the application server 2207 to authenticate a second electronic device 2202 account or a second electronic device 2202 user account.

In operation 2418, the application server 2207 may authenticate the second electronic device 2202 account or the second electronic device 2202 user account and identify data of the corresponding user. In operation 2420, the application server 2207 may transmit the data to the profile server 2205. In operation 2422, the profile server 2205 may transmit the data transmitted from the application server 2207 to the first electronic device 2201. In operation 2424, the first electronic device 2201 may transmit the data received from the profile server 2205 to the second electronic device 2202 by using the profile agent 2221 of the second electronic device sandbox 2220.

As described above, if the second electronic device sandbox 2220 is used, the second electronic device 2202 can also perform a pairing through another user's first electronic device 2201 other than the same user's electronic device which is permitted to be paired with the second electronic device 2202, and may receive a function through the second electronic device sandbox 2220 of the another user's first electronic device paired with the second electronic device 2202.

One of the first electronic device 2201 and the second electronic device 2202 determine whether a sandbox pairing stop event occurs while performing a function through the second external electronic device sandbox 2220. According to various embodiments, the sandbox pairing stop event may occur when a first electronic device 2201 user requests a sandbox pairing stop, when a second electronic device 2202 user requests a sandbox pairing stop, or when the first electronic device 2201 and the second electronic device 2202 are disconnected from each other. In addition, the sandbox pairing stop event may occur according to various other conditions.

When a sandbox pairing stop event occurs, the first electronic device 2201 may delete the second electronic device sandbox 2220. According to an embodiment, when a sandbox pairing stop request event by a user occurs, the first electronic device 2201 may notify to the second electronic device 2201 that the sandbox pairing is stopped, and delete the second electronic device sandbox 2220. According to an embodiment, when a sandbox pairing stop request event by the second electronic device 2202 occurs, the first electronic device 2201 may delete the second electronic device sandbox 1620 in response to the request. According to an embodiment, when the first electronic device 2201 is disconnected from the second electronic device 2202 and then are not reconnected with the second electronic device 2202 for a predetermined time, the first electronic device 2201 may delete the second electronic device sandbox 2220. According to an embodiment, when disconnected from the second electronic device 2202, the first electronic device 2201 may notify both the first electronic device 2201 user and the second electronic device 2202 user of the disconnection, and delete the second electronic device sandbox 2220 according to selection of one of the first electronic device 2201 user and the second electronic device 2202 user. When the second electronic device sandbox 2220 is deleted, the profile agent 2221 installed in the second electronic device sandbox 2220 may be deleted.

The above-described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

FIGS. 1-24 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. For example, and without limitation, it will be understood that the phrase "install an application" may refer to at least one of "instantiating the application" and/or storing in memory (e.g., volatile memory, non-volatile memory, etc.) processor-executable code corresponding to the application.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
   a memory including a first memory area associated with a first application; and
   at least one processor operatively coupled to the memory, configured to:
   detect that a connection is established between the electronic device and an external electronic device,
   receive information for allocating a second memory area from the external electronic device in response to detecting that the connection is established,
   allocate the second memory area based on the received information to store data associated with a second application of the external electronic device in the memory and assign an authority of the second memory area to the external electronic device, and
   control the memory to store the data associated with the second application of the external electronic device in the second memory area,
   wherein the second application is executed using the second memory area in response to a request of the external electronic device,
   wherein the first memory area is allocated in the memory separately from the second memory area, and the first memory area is configured not to store the data associated with the second application of the external electronic device, and
   wherein the data is transmitted or received between the electronic device and the external electronic device while executing the second application by the external electronic device.

2. The electronic device of claim 1, wherein the second memory area is configured not to share data with the first application,
   wherein the received information for allocating the second memory area includes at least one of an external electronic device ID, a key of the external electronic device, user information of the external electronic device, and environment information of the external electronic device.

3. The electronic device of claim 1, wherein the first memory area and the second memory area are associated with at least one of respective user identifiers, and respective tag information.

4. The electronic device of claim 1, wherein:
   the first application and the second application are associated with a same application identifier, and
   the first application and the second application are associated with different user identifiers.

5. The electronic device of claim 1, wherein the second memory area is configured as a security area.

6. The electronic device of claim 1, wherein the at least one processor is further configured to:
   install a profile agent program in the second memory area,
   receive data from a profile server via the profile agent program, and
   transmit the data to the external electronic device.

7. The electronic device of claim 1, wherein the at least one processor is further configured to:
   start transmitting, to the external electronic device when the second application is executing in the second memory, the data associated with the second application of the external electronic device;
   stop transmitting the data in response to a stop request; and
   deallocate the second memory area.

8. The electronic device of claim 1, wherein:
   the at least one processor is further configured to deallocate the second memory area, and
   deallocating the second memory area includes at least one of: deleting data associated with a user identifier corresponding to the second memory area, and deleting data associated with a second application that is executed in the second memory area.

9. The electronic device of claim 1, wherein the at least one processor is further configured to deallocate the second memory area in response to detecting that the connection is interrupted.

10. The electronic device of claim 9, wherein, the second memory area is deallocated in response to detecting that the connection is interrupted for longer than a threshold period.

11. The electronic device of claim 1, wherein data of the external electronic device and an agent of the second memory area share a security key, further comprising a communication module arranged to transmit and receive data encoded by using the security key.

12. A method for use in a portable electronic device having a memory including a first memory area, the method comprising:
- detecting that a connection is established between the portable electronic device and an external electronic device;
- receiving information for allocating a second memory area from the external electronic device in response to detecting that the connection is established;
- allocating the second memory area based on the received information to store data associated with a second application of the external electronic device in the memory and assigning an authority of the second memory area to the external electronic device; and
- storing the data associated with the second application of the external electronic device in the second memory area,
- wherein the second application is executed using the second memory area in response to a request of the external electronic device,
- wherein the first memory area is allocated in the memory separately from the second memory area, and the first memory area is configured not to store the data associated with the second application of the external electronic device, and
- wherein the data is transmitted or received between the electronic device and the external electronic device while executing the second application by the external electronic device.

13. The method of claim 12, further comprising:
- executing a first application that corresponds to the portable electronic device in the first memory area, the second application that corresponds to the external electronic device is executed in the second memory area,
- wherein the received information for allocating the second memory area includes at least one of an external electronic device ID, a key of the external electronic device, user information of the external electronic device, and environment information of the external electronic device.

14. A non-transitory computer-readable medium storing one or more processor-executable instructions, which when executed by at least one processor cause the processor to execute a method comprising the steps of:
- allocating a first memory area;
- detecting that a connection is established between an electronic device and an external electronic device;
- receiving information for allocating a second memory area from the external electronic device in response to detecting that the connection is established;
- allocating the second memory area based on the received information to store data associated with a second application of the external electronic device in the memory and assigning an authority of the second memory area to the external electronic device; and
- storing the data associated with the second application of the external electronic device in the second memory area,
- wherein the second application is executed using the second memory area in response to a request of the external electronic device,
- wherein the first memory area is allocated in the memory separately from the second memory area, and the first memory area is configured not to store the data associated with the second application of the external electronic device, and
- wherein the data is transmitted or received between the electronic device and the external electronic device while executing the second application by the external electronic device.

15. The non-transitory computer-readable medium of claim 14, wherein the method further comprises the steps of:
- executing a first application that corresponds to the electronic device in the first memory area; and
- executing the second application that corresponds to the external electronic device,
- wherein the received information for allocating the second memory area includes at least one of an external electronic device ID, a key of the external electronic device, user information of the external electronic device, and environment information of the external electronic device.

16. A portable electronic device, comprising:
- a communication module;
- a memory including a first area allocated to the portable electronic device; and
- at least one processor operatively coupled to the memory, configured to:
- detect that a connection is established between the portable electronic device and an external electronic device, the connection being established by using the communication module;
- receive information for allocating a second area from the external electronic device in response to detecting that the connection is established; and
- allocate the second area based on the received information to store data associated with a second application of the external electronic device in the memory and assign an authority of the second area to the external electronic device,
- wherein the second application is executed using the second area in response to a request of the external electronic device, and
- wherein the first area is allocated in the memory separately from the second area, and the first area is configured not to store the data associated with the second application of the external electronic device.

17. The portable electronic device of claim 16, wherein the external electronic device includes another portable electronic device,
- wherein the received information for allocating the second area includes at least one of an external electronic device ID, a key of the external electronic device, user information of the external electronic device, and environment information of the external electronic device.

18. A portable electronic device, comprising:
- a communication module; and
- a memory that includes a first area corresponding to the portable electronic device and a second area corresponding to an external electronic device,
- at least one processor operatively coupled to the memory, configured to:
- receive information for allocating the second area of the memory from the external electronic device in response to a connection being established between the portable electronic device by using the communication module,
- allocate the second area based on the received information to store data associated with a second application of the external electronic device in the memory, wherein the second application is executed using the second area in response to a request of the external electronic device, and wherein the first area is allocated in the memory separately from the second area, and the first area is configured not to store the data associated with the second application of the external electronic device.

19. The portable electronic device of claim 18, wherein the external electronic device includes a wearable device, wherein the received information for allocating the second area includes at least one of an external electronic device ID, a key of the external electronic device, user information of the external electronic device, and environment information of the external electronic device.

\* \* \* \* \*